United States Patent
Fujii et al.

(10) Patent No.: US 11,561,334 B2
(45) Date of Patent: Jan. 24, 2023

(54) DIFFUSIVE BODY AND ILLUMINATION DEVICE

(71) Applicant: Mitsubishi Electric Corporation, Tokyo (JP)

(72) Inventors: Yusuke Fujii, Tokyo (JP); Satoru Okagaki, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 17/441,293

(22) PCT Filed: Mar. 25, 2020

(86) PCT No.: PCT/JP2020/013240
§ 371 (c)(1),
(2) Date: Sep. 21, 2021

(87) PCT Pub. No.: WO2020/196594
PCT Pub. Date: Oct. 1, 2020

(65) Prior Publication Data
US 2022/0186907 A1 Jun. 16, 2022

(30) Foreign Application Priority Data
Mar. 28, 2019 (JP) .............................. JP2019-062319

(51) Int. Cl.
*F21V 8/00* (2006.01)
(52) U.S. Cl.
CPC .......... *G02B 6/0011* (2013.01); *G02B 6/0043* (2013.01); *G02B 6/0051* (2013.01)
(58) Field of Classification Search
CPC .. G02B 6/0043; G02B 6/0051; F21V 2200/20
See application file for complete search history.

(56) References Cited

U.S. PATENT DOCUMENTS

| 2011/0222309 A1 | 9/2011 | Shinohara | |
| 2014/0133125 A1* | 5/2014 | Di Trapani | G02B 6/0011 |
| | | | 362/2 |

(Continued)

FOREIGN PATENT DOCUMENTS

| CN | 108776365 A | 11/2018 |
| EP | 2304478 A1 | 4/2011 |

(Continued)

OTHER PUBLICATIONS

Office Action dated May 10, 2022, in corresponding Japanese patent Application No. 2021-509486, 12 pages.

(Continued)

*Primary Examiner* — Sean P Gramling
(74) *Attorney, Agent, or Firm* — Xsensus LLP

(57) ABSTRACT

The diffusive body lets first light enter and emits scattered light, wherein a scattering layer and a transmission layer, the diffusive body has a light incidence surface that lets the first light enter and a main surface where a first light emission surface emitting the scattered light is formed, the light incidence surface is formed at an end face forming a first end part of the main surface, the diffusive body functions as a light guide path that makes the entered first light move to and fro between the scattering layer and the transmission layer, the scattering layer includes an optical medium on a nanometer order and generates the scattered light by having the first light scattered by the optical medium on the nanometer order, and a correlated color temperature of the scattered light is higher than the correlated color temperature of the first light.

20 Claims, 23 Drawing Sheets

(56) References Cited

U.S. PATENT DOCUMENTS

| | | |
|---|---|---|
| 2015/0378083 A1 | 12/2015 | Takakusaki |
| 2017/0051893 A1 | 2/2017 | Di Trapani |
| 2018/0017233 A1 | 1/2018 | Takeshita |
| 2018/0246270 A1 | 8/2018 | Di Trapani et al. |
| 2018/0345630 A1 | 12/2018 | Di Trapani et al. |
| 2021/0190279 A1 | 6/2021 | Fujii et al. |

FOREIGN PATENT DOCUMENTS

| | | |
|---|---|---|
| JP | 2008-130279 A | 6/2008 |
| JP | 2010-123309 A | 6/2010 |
| JP | 2011-253663 A | 12/2011 |
| JP | 2013-140703 A | 7/2013 |
| JP | 2015-125836 A | 7/2015 |
| JP | 2015-207554 A | 11/2015 |
| JP | 2016-12540 A | 1/2016 |
| JP | 2018-10755 A | 1/2018 |
| JP | 2018-530134 A | 10/2018 |
| JP | 2019-503034 A | 1/2019 |
| WO | 2018/157903 A1 | 9/2018 |
| WO | 2019/220656 A1 | 11/2019 |

OTHER PUBLICATIONS

Extended European search report dated Apr. 22, 2022, in corresponding European patent Application No. 20776452.3, 13 pages.
Wikipedia, "Color temperature", retrieved on Mar. 30, 2022, total 19 pages, XP55906819. Retrieved from the Internet: URL:https://en.wikipedia.org/wiki/Color_temperature.
International Search Report and Written Opinion dated Jun. 9, 2020, received for PCT Application PCT/JP2020/013240, Filed on Mar. 25, 2020, 13 pages including English Translation.

* cited by examiner

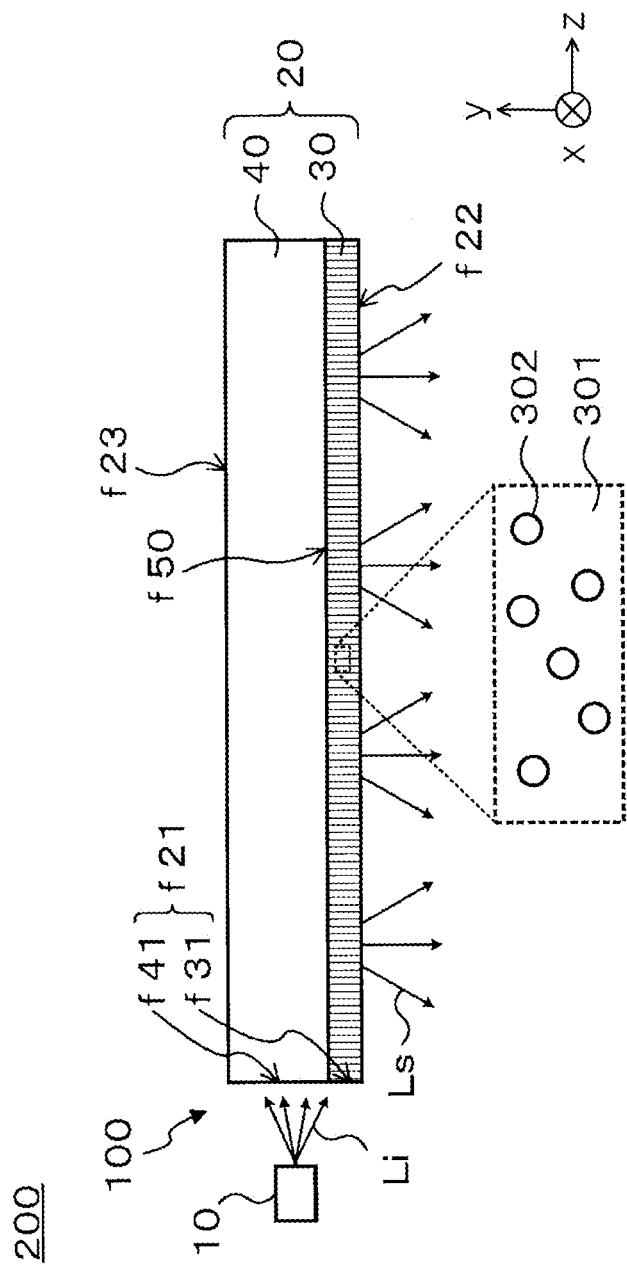

DIFFUSIVE BODY AND ILLUMINATION DEVICE

CROSS-REFERENCE TO RELATED APPLICATIONS

The present application is based on PCT filing PCT/JP2020/013240, filed Mar. 25, 2020, which claims priority to JP 2019-062319, filed Mar. 28, 2019, the entire contents of each are incorporated herein by reference.

TECHNICAL FIELD

The present disclosure relates to a diffusive body, an illumination unit and an illumination device.

BACKGROUND ART

As an example of an illumination device that simulates a natural sky, there is an illumination system described in Patent Reference 1. The illumination system described in the Patent Reference 1 includes a first light source (2) and a lamp shade structure (10). The lamp shade structure (10) includes a screen structure (14) and a base body (12), and the base body (12) includes a diffuse light generation body (20). The diffuse light generation body (20) works as a Rayleigh diffuser, absorbs substantially no light in the visible light region, and more efficiently diffuses colliding light at shorter wavelengths compared to long wavelength components. The first light source (2) and the lamp shade structure (10) are arranged in a camera *obscura* (16). The first light source (2) is placed at a position deviated from the center of the diffuse light generation body (20) in a vertical direction and a horizontal direction and irradiates the diffuse light generation body (20)'s top surface overall with light at an angle of approximately 60 degrees that is considered to be the angle of a principal ray.

PRIOR ART REFERENCE

Patent Reference

Patent Reference 1: Japanese Patent Application Publication No. 2015-207554

SUMMARY OF THE INVENTION

Problem to be Solved by the Invention

However, in the illumination system described in the Patent Reference 1, the first light source (2) for emitting light having strong directivity has to be arranged at the position deviated from the center of the diffuse light generation body (20) in the vertical direction and the horizontal direction, and thus there is a problem in that the thickness of the illumination device increases.

As a method for realizing a low-profile shape of an illumination device, it is effective to make light enter the diffusive body causing Rayleigh scattering (e.g., the aforementioned diffuse light generation body (20)) through an end part of the diffusive body. However, in such a configuration, while the light is guided in the diffusive body, light at a higher correlated color temperature is scattered more preferentially. Accordingly, there is a danger that color unevenness occurs at an emission surface depending on light guide distance in the diffusive body.

Incidentally, if the scattering probability in the light guide path is reduced by lowering the concentration of particles, the color unevenness can be reduced. However, in illumination devices that reproduce the color tone of a natural sky such as a blue sky (e.g., blue color with transparency) by using Rayleigh scattering, simply diffusing or scattering the entered white light like the so-called white illuminator does not work sufficiently well, and it is necessary to control the light so that the light emission surface looks like a natural sky due to the scattered light being emitted. More specifically, in the light emission body causing Rayleigh scattering (e.g., the aforementioned diffuse light generation body (20)), it is necessary to scatter light of a blue color wavelength at an appropriate ratio relative to light of other wavelengths. This is because such light control can make the light emission body be visually perceived as an illuminant having a color tone like a natural sky (giving a feeling of depth).

In consideration of the above-described situation, the object of the present disclosure is to provide a diffusive body, an illumination unit and an illumination device that are low-profile and capable of achieving both reproducibility of the sky and suppression of the color unevenness.

Means for Solving the Problem

A diffusive body according to the present disclosure is a diffusive body that lets first light enter and emits scattered light, wherein a scattering layer that exerts predetermined scattering power on the first light and a transmission layer that passes through the first light are stacked together, the diffusive body has a light incidence surface that lets the first light enter and a main surface where a first light emission surface emitting the scattered light is formed, the light incidence surface is formed at an end face forming a first end part of the main surface, the diffusive body functions as a light guide path that makes the entered first light move to and fro between the scattering layer and the transmission layer, the scattering layer includes an optical medium on a nanometer order and generates the scattered light by having the entered first light scattered by the optical medium on the nanometer order, and a correlated color temperature of the scattered light is higher than the correlated color temperature of the first light.

An illumination device according to the present disclosure includes the aforementioned diffusive body and a light source that emits the first light.

Effect of the Invention

According to the present disclosure, it is possible to provide a diffusive body, an illumination unit and an illumination device that are low-profile and capable of achieving both the reproducibility of the sky and the suppression of the color unevenness.

BRIEF DESCRIPTION OF THE DRAWINGS

FIG. 2 is a cross-sectional view showing a schematic configuration of the illumination device according to the first embodiment.

MODE FOR CARRYING OUT THE INVENTION

Figure 1:
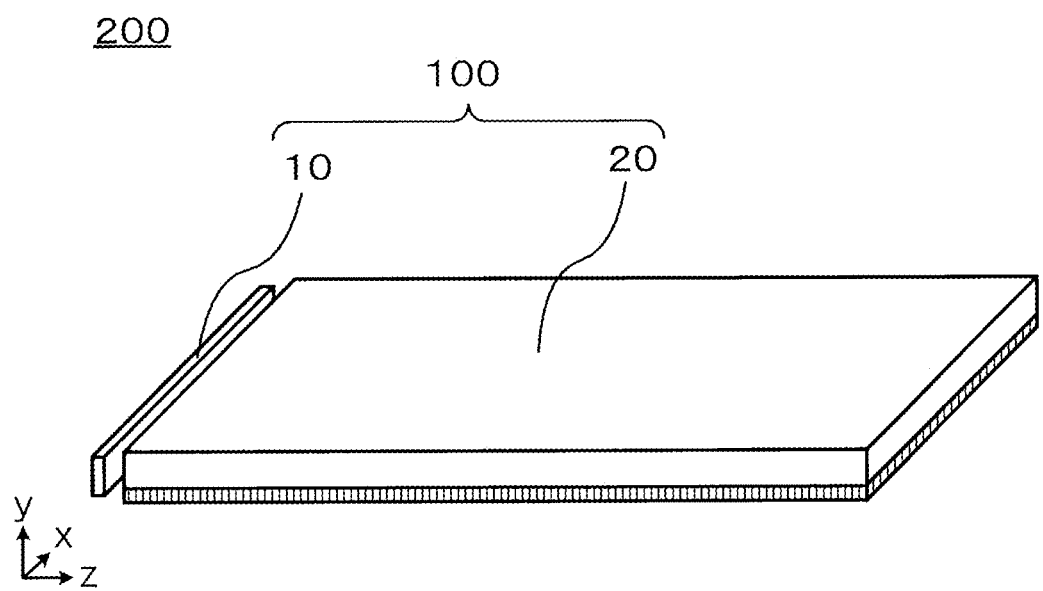
FIG. 1 is a perspective view showing a schematic configuration of an illumination device according to a first embodiment.

Embodiments of a diffusive body, an illumination unit and an illumination device according to the present disclosure will be described below with reference to the drawings. The following embodiments are just examples and it is possible to appropriately combine some of the embodiments and to appropriately modify each embodiment.

In the drawings referred to below, the reduction scale of dimensions can be varied among components. In the following embodiments, coordinate axes of an xyz orthogonal coordinate system can be shown in each drawing to facilitate the explanation. In that case, a main emission direction, as a direction in which scattered light simulating the sky is mainly emitted from a light emission body, is defined as a −y-axis direction. Further, among directions orthogonal to the main emission direction, a direction closet to a traveling direction of light incident upon the light emission body is defined as a z-axis direction.

Here, the main emission direction may be paraphrased as a normal direction of a main light emission surface of the light emission body. The main light emission surface means a surface particularly specified among light emission surfaces of the light emission body. More specifically, the main light emission surface may be a surface that is specially desired to be visually perceived by a user as a light emission surface simulating the sky among the light emission body's light emission surfaces as the surfaces emitting illuminating light.

For example, in a light emission body in a plate-like shape, the main light emission surface is one of two surfaces (hereinafter referred to as "main surfaces") connected to each other by a side face. Here, the plate-like shape is a shape having two main surfaces connected to each other by a side face. In the following description, there are cases where one of the two main surfaces connected to each other by a side face in the plate-like shape is referred to as a first surface and the other is referred to as a second surface. Further, there are cases where the side face of the plate-like shape is referred to as an end face of the main surfaces.

For example, in a light emission body in a rod-like shape, the main light emission surface is one of side faces of a columnar body or a region as a part of a side faces of the columnar body. Here, the rod-like shape is the shape of a columnar body in which two bases are connected to each other by one side face or a plurality of side faces. Incidentally, the rod is a generic name for columnar bodies. In the rod-like shape, irrespective of whether the shape is a cylinder, a prism or the like, the side face (outer surface in case of a hollow body) connected to the two bases can hereafter be referred to as a main surface, and the bases can hereafter be referred to as end faces. Further, in order to discriminate a region in the main surface from another region, in case where the main light emission surface is formed in a region as a part of the main surface (side face of a columnar body) in a light emission body in a rod-like shape, the region can be referred to as a first surface, and a region in the main surface on the side opposite to the first surface can be referred to as a second surface. Furthermore, in case where the main light emission surface is installed as a window, for example, the main light emission surface is a surface whose normal direction is pointed towards the inside of a room.

Incidentally, the main light emission surface is not limited to a flat surface but can include a curved surface or an inclined surface, for example. The main light emission surface can be, for example, curved or inclined, or can be a combination of some of such flat, curved and inclined surfaces. In case where the main light emission surface is not a flat surface, the normal direction of the main light emission surface can be a normal direction of a central part or a normal direction of a tangential plane. Incidentally, in case where the main light emission surface forms the whole of an outer edge in a xy cross section, such as a case where the side face of a cylinder is formed as the main light emission surface, the main emission direction may be defined as the normal direction at an arbitrary position on the main light emission surface. In the following embodiments, the main emission direction is regarded as one of emission directions of the illuminating light from an illumination device 200.

First Embodiment

A first embodiment will be described below with reference to the drawings.

(Configuration of Illumination Device 200)

FIG. 1 and FIG. 2 are schematic diagrams showing an example of an illumination device 200 according to a first embodiment. Specifically, FIG. 1 is a perspective view showing a schematic configuration of the illumination device 200 and FIG. 2 is a cross-sectional view showing a schematic configuration of the illumination device 200.

The illumination device 200 includes a light source 10 and a diffusive body 20 as the light emission body. The diffusive body 20 includes a scattering layer 30 and a transmission layer 40.

In the following description, the diffusive body 20 and one or more light sources 10 provided paired with the diffusive body 20 can be collectively referred to as an illumination unit 100. Namely, the illumination unit 100 is formed with the light source(s) 10 and the diffusive body 20 as a pair. Incidentally, although illustration is left out, the illumination device 200 may include a frame body that supports the illumination unit 100.

While the following description will be given assuming that a y-axis direction is a thickness direction of the diffusive body 20 (vertical direction), a z-axis direction is a transverse direction (width direction) and an x-axis direction is a longitudinal direction (depth direction) for convenience of explanation, these directions and directions in the actual installation condition do not necessarily coincide with each other.

In the example shown in FIG. 2, the main light emission surface is a surface f22. In this example, light is incident upon an end face f21, which forms an end part of the surface f22 of the diffusive body 20, in the +z-axis direction, and scattered light caused by a scattering effect of the diffusive body 20 (more specifically, the scattering layer 30 included in the diffusive body 20) on the incident light is emitted from the surface f22, which lets the diffusive body 20 be visually perceived as an illuminant emitting light similar to a natural sky. Incidentally, the main light emission surface can also be a region as a part of the surface f22. Further, the main light emission surface can also be formed on the surface f22.

In the following description, the light incident upon the end face of the diffusive body 20 can be referred to as light Li. Further, the scattered light emitted from the diffusive body 20 and simulating the sky can be referred to as light Ls, scattered light Ls or diffuse light Ls. Furthermore, in the following description, light guided in the diffusive body 20 can be referred to as light Lt or propagating light Lt. Here, to "guide light" means to allow light entering a certain medium to propagate according to a predetermined optical path in the medium. Therefore, the light Lt does not include light scattered or absorbed in the diffusive body 20.

Incidentally, as will be described later, the light emission surface of the diffusive body 20 from which the light Ls is emitted is not limited to one surface. For example, the light Ls can be emitted also from a surface f23 on the side opposite to the surface f22.

((Light Source 10))

Figure 3A:
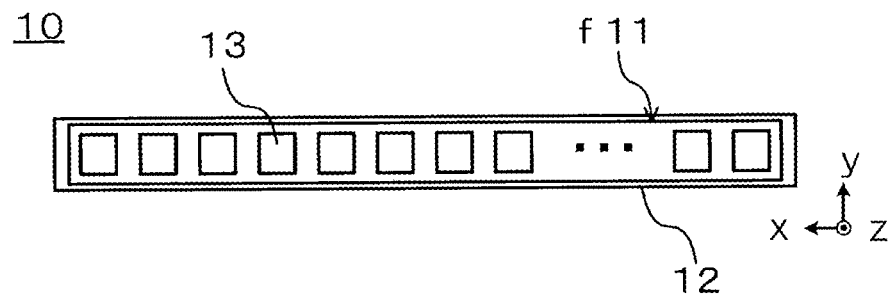
FIGS. 3A and 3B are schematic diagrams showing schematic configurations of a light source according to the first embodiment.
Figure 3B:
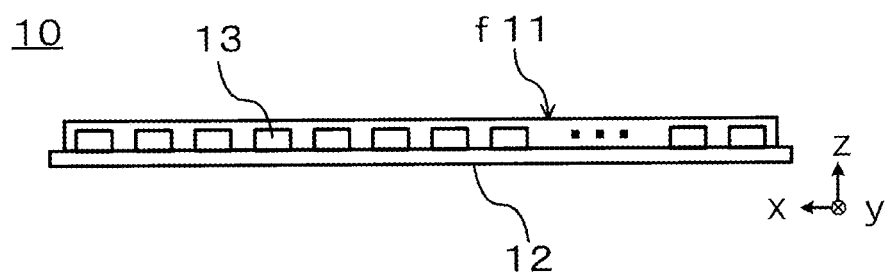
Figure 4:
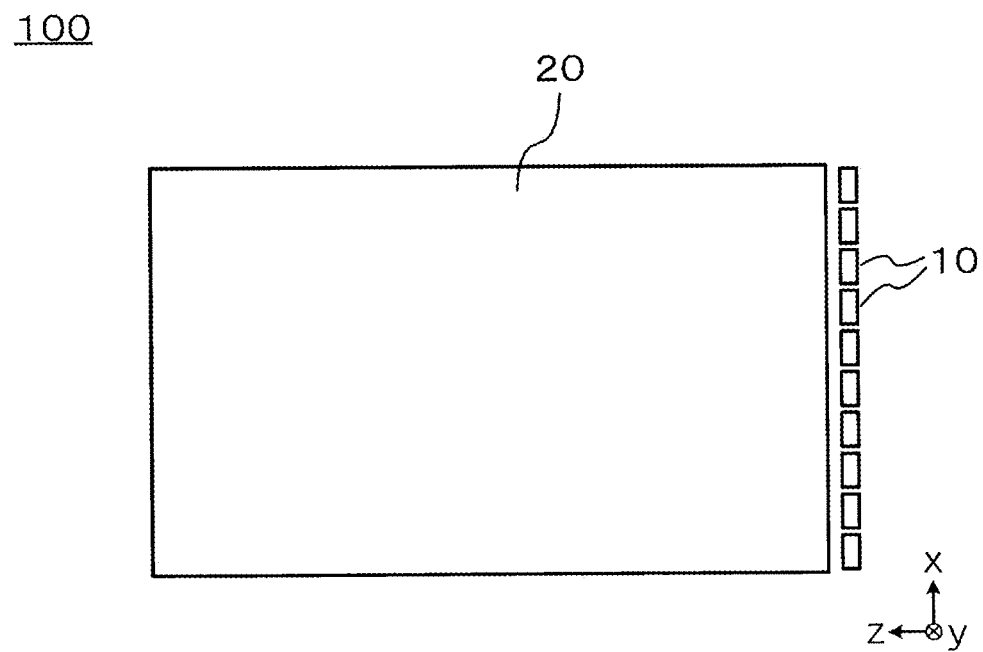
FIG. 4 is a schematic diagram showing an example of arrangement of the light sources according to the first embodiment.

FIGS. 3A and 3B are schematic diagrams showing schematic configurations of the light source according to the first embodiment. FIG. 4 is a schematic diagram showing an example of arrangement of the light sources according to the first embodiment. The light source 10 can be an LED light source, for example. The light source 10 may include a substrate 12 and LED elements 13 as shown in FIGS. 3A and 3B. In the example shown in FIGS. 3A and 3B, a plurality of LED elements 13 are provided. The LED elements 13 are arranged on the substrate 12. Here, the LED element is an example of a light-emitting element.

The light source 10 is provided to face an end face forming an end part of the surface f22 where the main light emission surface of the diffusive body 20 is formed. For example, the light source 10 has a light emission surface f11 emitting the light Li as the light incident upon the diffusive body 20, and is arranged so that the light emission surface f11 faces the end face forming the end part of the surface f22 where the main light emission surface of the diffusive body 20 is formed.

As shown in FIG. 4, the illumination device 200 may include a plurality of light sources 10 for one diffusive body 20. Here, a unit of light sources 10 is assumed to be a unit on which on/off control, light emission amount control or light emission color control can be performed independently. Incidentally, the illumination device 200 may also be configured to include only one light source 10 for one diffusive body 20 in the illumination unit 100.

In the following description, a set of light sources or light-emitting elements (or one light source or light-emitting element) emitting the incident light, causing the light Ls simulating the sky, to one diffusive body 20 can be collectively referred to as a light source 10. Further, while the function of the light source to emit the light Li will be described below by using the light source 10 as the subject of the sentence, this function can be regarded either as a function of one light source or light-emitting element included in the illumination unit 100 or as a function implemented by the combination of a plurality of light sources or light-emitting elements.

As an example, in the configuration example of the light source 10 shown in FIGS. 3A and 3B, it is also possible to regard each of the illustrated LED elements 13 as one light source 10. In that case, each of the light sources 10 corresponding to the illustrated LED elements 13 is not prohibited from having the configuration of the light source 10 shown in FIGS. 3A and 3B (i.e., configuration including a plurality of LED elements 13). Further in the arrangement example of the light sources 10 shown in FIG. 4, it is also possible to regard each of the illustrated light sources 10 as one LED element 13.

The light source 10 emits the light Li as the light incident upon the diffusive body 20. For example, the light source 10 emits white light as the light Li. For example, the light source 10 may emit light at a predetermined correlated color temperature Tci as the light Li.

The correlated color temperature Tci is 6500 K, for example. Alternatively, the correlated color temperature Tci is 5000 K, for example. The correlated color temperature of the light emitted from each light source 10 can be either the same as each other or different from each other.

The color of the light Li emitted from the light source 10 can also be color other than white. For example, the illumination unit 100 can include a white color light source and a green color-based light source as the light source 10. Further, the illumination unit 100 can include a white color light source, a green color light source and an orange color light source as the light source 10. Furthermore, the illumination unit 100 can include a white color light source at a different color temperature as the light source 10. For example, the illumination unit 100 can include a white color light source at a high color temperature and a white color light source at a low color temperature as the light source 10.

Here, the color temperature difference between the white color at the high color temperature and the white color at the low color temperature is 8800 K, for example. The correlated color temperature of the white color at the high color temperature is 14400 K, for example. The correlated color temperature of the white color at the high color temperature is higher than or equal to 11500 K, for example. The correlated color temperature of the white color at the high color temperature is lower than or equal to 19000 K, for example. The correlated color temperature of the white color at the low color temperature is 5600 K, for example. The correlated color temperature of the white color at the low color temperature is higher than or equal to 5500 K, for example. The correlated color temperature of the white color at the low color temperature is lower than or equal to 6050 K, for example.

Incidentally, besides the arrangement of the light source 10 shown in FIG. 4 to face one end face forming the end part of the surface f22 where the main light emission surface is formed, the light source 10 may be arranged to face two or more end faces forming the end part. Even in such cases, the light source 10 is regarded as the light source 10 in this embodiment as long as the light source 10 works as a light source that makes the light Li enter one diffusive body 20 through an end part of the diffusive body 20.

For example, the light source 10 (more specifically, its light emission surface f11) may be arranged to face at least one of end faces forming an end part of the surface f22 where the main light emission surface of the diffusive body 20 is formed. Further, for example, a plurality of light sources 10 may be arranged along at least one of end faces forming an end part of the surface f22 where the main light emission surface of the diffusive body 20 is formed.

Figure 5:
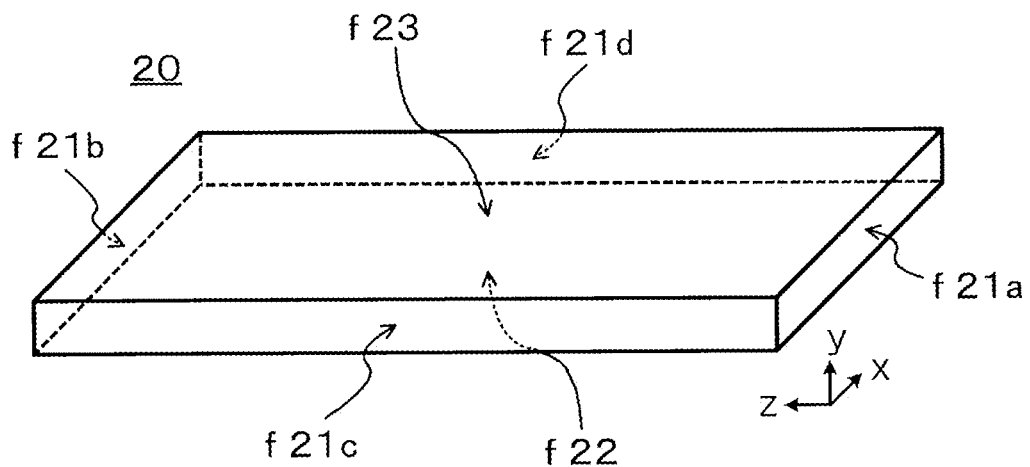
FIG. 5 is a perspective view showing an example of a diffusive body according to the first embodiment.
Figure 6:
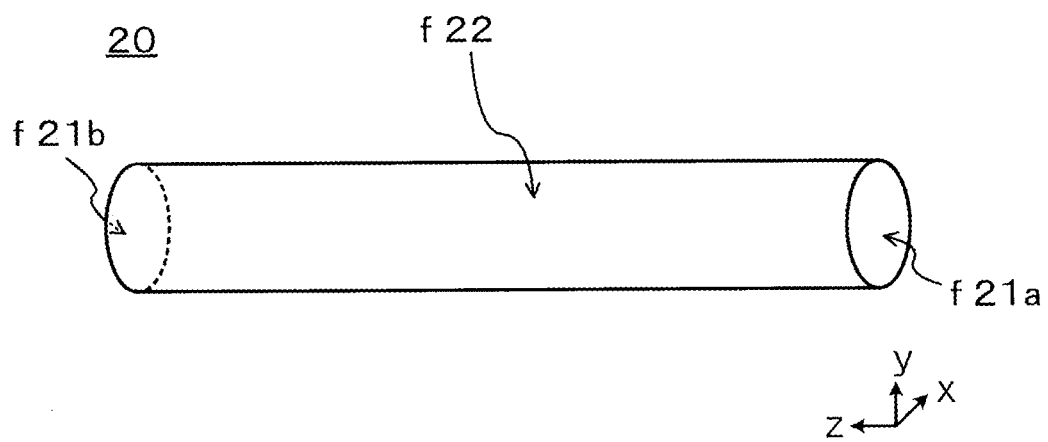
FIG. 6 is a perspective view showing an example of the diffusive body according to the first embodiment.

FIG. 5 and FIG. 6 are perspective views showing examples of the diffusive body 20. For example, when the diffusive body 20 is in a rectangular plate-like shape as shown in FIG. 5 and has four side faces (end faces f21a, f21b, f21c and f21d in FIG. 5) and two main surfaces (a first surface f22 and a second surface f23 in FIG. 5) connected to the four side faces, the light source 10 may be arranged as described below. Incidentally, illustration of the scattering layer 30 and the transmission layer 40 is left out in FIG. 5 to avoid limitation on the number of stacked layers, a stacking order and thicknesses of the scattering layer 30 and the transmission layer 40 in the diffusive body 20.

As an example, the light source 10 may be arranged to face the end face f21a of the diffusive body 20. In this case, a plurality of light sources 10 may be arranged along the end face f21a of the diffusive body 20. Further, as an example, the light source 10 may be arranged to face the end face f21a and the end face f21b of the diffusive body 20. In this case, a plurality of light sources 10 may be arranged along the end face f21a and the end face f21b of the diffusive body 20. Furthermore, as an example, the light source 10 may be arranged to face the end face f21a, the end face f21b and the end face f21c of the diffusive body 20. In this case, a plurality of light sources 10 may be arranged along the end face f21a, the end face f21b and the end face f21c of the diffusive body 20. Moreover, as an example, the light source 10 may be arranged to face the end face f21a, the end face f21b, the end face f21c and the end face f21d of the diffusive body 20. In this case, a plurality of light sources 10 may be arranged along the end face f21a, the end face f21b, the end face f21c and the end face f21d of the diffusive body 20.

Further, as an example, the light source 10 may be arranged to face at least one of the end face f21a, the end face f21b, the end face f21c and the end face f21d of the diffusive body 20. In this case, a plurality of light sources 10 may be arranged along at least one of the end face f21a, the end face f21b, the end face f21c and the end face f21d of the diffusive body 20.

Incidentally, the shape of the diffusive body 20 is not limited to the rectangular plate-like shape. When the shape of the diffusive body 20 is a different shape, the aforementioned positional relationship among the end faces and the light source may be employed by replacing a certain end face with another end face opposing the certain end face, another end face adjoining the certain end face, or the like, for example. Alternatively, the aforementioned positional relationship among the end faces and the light source can be employed by replacing a certain region as a part of a continuous side face with another region as a part situated at a position opposing the certain region, another region as a part situated at a position adjoining the certain region, or the like, for example.

For example, when the diffusive body 20 is in a rod-like shape as shown in FIG. 6 with two bases (end faces f21a and f21b in FIG. 6) and the main light emission surface is formed on the side face (main surface f22 in FIG. 6), the light source 10 may be arranged as described below.

As an example, the light source 10 may be arranged to face the end face f21a of the diffusive body 20. In this case, it is possible to arrange either only one light source 10 or a plurality of light sources 10 corresponding to the end face f21a of the diffusive body 20. For example, a plurality of light sources 10 may be arranged along an outer peripheral shape of the end face f21a or arranged to be even in the face. Further, as an example, the light source 10 may arranged to face the end face f21a and the end face f21b of the diffusive body 20. In this case, it is possible to arrange either only one light source 10 or a plurality of light sources 10 corresponding to each of the end face f21a and the end face f21b of the diffusive body 20. For example, a plurality of light sources 10 may be arranged along the outer peripheral shape of each of the end face f21a and the end face f21b or arranged to be even in each face.

Further, in consideration of ZEB (Zero Energy Building), for example, light obtained by guiding external light (e.g., sunlight) can be substituted for the light Li from the light source 10. For the guiding of the external light, a light intake member or light guide body that takes in the external light and emits the light in a predetermined direction can be used. The illumination unit 100 can include such a light intake member or light guide body as the light source 10.

((Diffusive Body 20))

Next, the diffusive body 20 will be described with reference to the drawings.

As shown in FIG. 2, the diffusive body 20 is a structure including the scattering layer 30 and the transmission layer 40, and has at least a first surface (the surface f22 in FIG. 2) forming the main light emission surface and an end face (the surface f21 in FIG. 2) forming an end part of the first surface.

The main light emission surface may also be a region as a part of the first surface. The main light emission surface may also be formed on the first surface. An incidence surface is formed in the end part of the first surface. For example, the incidence surface is formed at the end face forming the end part of the first surface. Incidentally, the incidence surface may also be a region as a part of the end face. The incidence surface may also be formed on the end face. For example, the incidence surface is formed in an end part of the diffusive body 20 in the z-axis direction. When the diffusive body 20 is in a plate-like shape, the aforementioned end part includes a side face of the plate-like shape. When the diffusive body 20 is in a rod-like shape, the aforementioned end part includes a base of the rod-like shape.

The diffusive body 20 may further have a second surface (the surface f23 in FIG. 2) on the side opposite to the first surface. In the following description, the first surface can be referred to as a front surface f22, and the end face can be referred to as a side face f21. Further, when the diffusive body 20 has the second surface, the second surface can be referred to as a back surface f23.

((Scattering Layer 30))

The scattering layer 30 is a layer that exerts predetermined scattering power on the light Li. The scattering layer 30 includes a base material 301 and particles 302, for example.

The particles 302 are nanoparticles, for example. The "nanoparticles" are particles having size on the order of nanometers (nm). The nanoparticles generally mean particles that are 1 nm to some hundred nm in size. The particles 302 are particles whose particle diameter is on the nanometer order, for example.

The particle 302 can have a spherical shape or a different shape.

The diffusive body 20 can include multiple types of particles 302. In that case, the particle diameter of the particles 302 may be defined as an average particle diameter.

The particles 302 are inorganic oxide, for example. The inorganic oxide is ZnO, $TiO_2$, $ZrO_2$, $SiO_2$, $Al_2O_3$ or the like, for example.

The particles 302 scatter the light Li entering the diffusive body 20 and generate the light Ls. Further, the particles 302 scatter the light Lt propagated in the diffusive body 20 (more specifically, in the scattering layer 30) and generate the light Ls.

The base material 301 may contain the particles 302, for example. Alternatively, the particles 302 may be added to the base material 301. The particles 302 are dispersed in the base material 301, for example.

While the base material 301 is not particularly limited, the base material 301 can be a transparent material, for example.

The base material 301 does not necessarily have to be transparent at all wavelengths of the light Li. As an example, the base material 301 may have absorption at a particular wavelength among the wavelengths of the light Li.

The transmittance (straight traveling transmittance) of the base material 301 in a light guide distance 5 mm at a design wavelength is preferably 90% or higher, more preferably 95% or higher, and still more preferably 98% or higher. Here, the design wavelength may be a predetermined wavelength among the wavelengths of the incident light. The design wavelength is not limited to one wavelength but can also be a plurality of wavelengths or a wavelength having a width (wavelength range). In case where the incident light is light of white color, for example, the design wavelength may be one or more wavelengths among 450 nm, 550 nm and 650 nm. Incidentally, the design wavelength can also be the three wavelengths 450 nm, 550 nm and 650 nm.

The base material 301 is solid matter, for example. The base material 301 can be, for example, a resin plate made by using a thermoplastic polymer, thermosetting resin, photo-polymerization resin or the like. As the resin plate, it is possible to use an acrylic polymer, an olefinic polymer, a vinyl-based polymer, a cellulosic polymer, an amide-based polymer, a fluoric polymer, an urethane-based polymer, a silicone-based polymer, an imide-based polymer or the like. The scattering layer 30 may be formed by, for example, dispersing the particles 302 in such a material of the base material 301 before the hardening and then executing the hardening process.

The scattering layer 30 may also be formed with, for example, porous material made by the sol-gel method, organic molecule dispersed material, organic-inorganic hybrid material (referred to also as organic-inorganic nano-composite material) or metallic particle dispersed material. As an example, the scattering layer 30 may be organic-inorganic hybrid resin, and can be hybrid resin of resin and inorganic oxide, for example. In this case, the scattering layer 30 includes inorganic oxide, generated by sol-gel hardening by using the base material 301 including inorganic oxide material and organic compound as the base, as a substance corresponding to the particles 302. Incidentally, in the present disclosure, minute cavities or the like generated by such a production process are also regarded as the particles 302.

Further, the scattering layer 30 may be a layer obtained by forming minute concavities and convexities smaller than the wavelength of blue light on the surface of the base material 301. In this case, the scattering layer 30 includes minute concave parts or convex parts formed on the surface of the base material 301 as the particles 302. In this case, the maximum diameter of the concave parts or the convex parts is desired to be on the nanometer order (e.g., size from 1 nm to some hundred nm).

Incidentally, it is permissible if the scattering layer 30 includes a mechanism causing Rayleigh scattering, and the particles 302 and the base material 301 do not have to be clearly discriminated from each other as different members in the scattering layer 30. Incidentally, the base material 301 is not limited to solid matter but can also be a liquid, a liquid crystal or a gel-like substance.

When the light Li enters the scattering layer 30, the scattering layer 30 guides part of the light. Further, when the light Li enters the scattering layer 30, the scattering layer 30 scatters part of the light. Furthermore, when the light Li enters the scattering layer 30, the scattering layer 30 lets part of the light enter the transmission layer 40 via an interface f50. When the light Lt from the transmission layer 40 enters the scattering layer 30 via the interface f50, the scattering layer 30 guides part of the light, scatters part of the light, and lets part of the light enter the transmission layer 40 again via the interface f50 similarly to the case of the light Li.

((Transmission Layer 40))

The transmission layer 40 is a layer having permeability for the light Li. Here, the "permeability" means a property of a medium to allow light under consideration to pass through the inside of the medium. A medium being transparent is included in examples of a medium having permeability. Incidentally, the permeability is not limited to cases where the whole of the incident light can pass through the medium. As an example, the permeability includes a case where the amount of light passing through the inside of the medium is relatively greater than the amount of light scattered or absorbed in the medium. The permeability in the transmission layer 40 can be evaluated by using, for example, the straight traveling transmittance, the haze value, or the mean free path of the light Lt in the diffusive body 20 which will be described later.

The transmission layer 40 guides the incident light Li therein as the light Lt by passing the light through without scatting the light with particles or the like in the layer. The transmission layer 40 is formed with a member having permeability for the light Li, for example. As an example, the transmission layer 40 may be formed with a member having straight traveling transmittance per unit distance at the aforementioned design wavelength that is at least higher than that of the member forming the scattering layer 30 (e.g., the base material 301 including the particles 302). Incidentally, this condition does not prohibit the transmission layer 40 from being formed with the same material as the base material 301, for example.

The transmittance of the transmission layer 40 in the light guide distance 5 mm at the design wavelength is preferably 90% or higher, more preferably 95% or higher, and still more preferably 99% or higher. Here, the transmittance of the transmission layer 40 in the light guide distance 5 mm may be paraphrased as the transmittance of the member forming the transmission layer 40 (e.g., the aforementioned transparent material) in the light guide distance 5 mm.

Incidentally, in the case where the transmission layer 40 is formed with the same material as the base material 301, the transmittance of the transmission layer 40 in the light guide distance 5 mm becomes equal to the transmittance of the base material 301 in the light guide distance 5 mm. However, even in that case, if the transmittance in the light guide distance 5 mm is compared between the members respectively forming those layers, the member forming the transmission layer 40 is higher in the transmittance than the member forming the scattering layer 30 (the whole layer including the particles 302). Further, if the haze value is compared between the members respectively forming those layers, the member forming the transmission layer 40 is lower in the haze value than the member forming the scattering layer 30.

The transmission layer 40 is solid matter, for example. The transmission layer 40 is formed with, for example, resin film using a thermoplastic polymer, thermosetting resin, photopolymerization resin or the like. As the material of the resin film, it is possible to use an acrylic polymer, an olefinic polymer, a vinyl-based polymer, a cellulosic polymer, an amide-based polymer, a fluoric polymer, an urethane-based polymer, a silicone-based polymer, an imide-based polymer or the like, for example. Incidentally, the transmission layer 40 is also not limited to solid matter but can also be a liquid, a liquid crystal or a gel-like substance.

((Guiding of Light Li in Diffusive Body 20))

Figure 7:
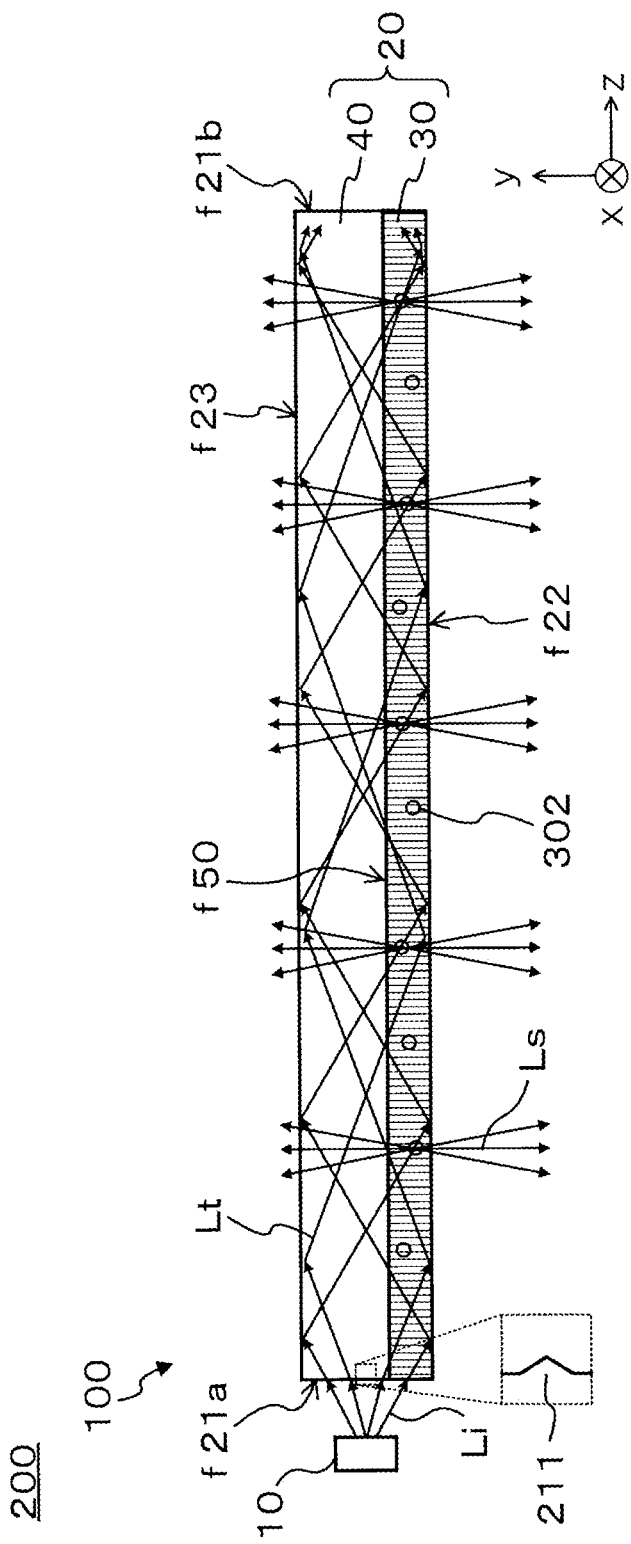
FIG. 7 is an explanatory diagram showing an example of light guiding of light Li and generation of light Ls in the diffusive body according to the first embodiment.

FIG. 7 is an explanatory diagram showing an example of the light guiding of the light Li and the generation of the light Ls in the diffusive body 20. In this example, the light Li emitted by the light source 10 enters the diffusive body 20. The diffusive body 20 guides the entered light Li. Further, the diffusive body 20 guides the entered light Li as the light Lt.

More specifically, the light Li emitted from the light source 10 enters the diffusive body 20 through the incidence surface (the end face f21a in the example in FIG. 7), and the diffusive body 20 guides the entered light therein as the light Lt, while scattering part of the light with the particles 302 or the like (not only nanoparticles but also composites (e.g., sol-gel hardened oxide), cavities, surface concave parts or surface convex parts having size on the nanometer order, hereinafter also referred to collectively as an optical medium on the nanometer order) and emitting the scattered light from at least the main light emission surface (the surface f22 in the example in FIG. 7) as the light Ls simulating the sky. Incidentally, the optical medium on the nanometer order is not particularly limited as long as the medium is an optical medium (or an interface) that causes Rayleigh scattering or a scattering phenomenon like Rayleigh scattering to the light Lt in the base material 301.

In the diffusive body 20, the light Lt is guided by repeated reflection by the main surface(s) (the two surfaces of the plate-like shape or the side face of the rod-like shape) or by the outer and inner surfaces of the side face in case of a hollow rod-like shape, for example. The reflection mentioned here is total reflection, for example. When the light Lt is guided in the diffusive body 20, the light Lt goes back and forth (moves to and fro) between the scattering layer 30 and the transmission layer 40 via the interface f50.

As shown in FIG. 7, the light Li that entered the diffusive body 20 travels in the +z-axis direction as the light Lt while going back and forth between the scattering layer 30 and the transmission layer 40. Then, the light Li, in the process of being guided in the diffusive body 20 as the light Lt, enters the scattering layer 30, and part of the light is scattered by the particles 302 or the like and is emitted as the light Ls. Then, at least part of the light Ls is emitted from the main light emission surface.

As above, the diffusive body 20 functions as a light guide path that makes the entered light Li move to and fro between the scattering layer 30 and the transmission layer 40. More specifically, the scattering layer 30 and the transmission layer 40 form a light guide path, in which the entered light Li alternately enters each other via the interface f50, in the diffusive body 20.

Incidentally, the illumination unit 100 may also be configured to make the optical axis of the light source 10 be inclined with respect to the z-axis of the diffusive body 20 in order to further increase light utilization efficiency. With this configuration, the amount of the light Lt that passes through the transmission layer 40 alone straight can be reduced. As a configuration achieving the same advantage, it is also possible to provide a central part of the incidence surface of the diffusive body 20 with a notch part (see the reference character 211 in FIG. 7), a prism or the like that deflects at least part of the light entering the diffusive body 20 towards an outer peripheral direction.

((Multilayer Structure of Scattering Layer 30 and Transmission Layer 40))

In the diffusive body 20 in this embodiment, the scattering layer 30 and the transmission layer 40 are stacked in an axial direction (y-axis direction in the drawing) parallel to the normal direction of the main light emission surface, and are optically connected to each other, for example.

Here, to be "optically connected to each other" means to be connected to each other with no air interface between the scattering layer 30 and the transmission layer 40. Therefore, it is permissible even if a layer other than air exists between the scattering layer 30 and the transmission layer 40. For example, it is permissible even if an adhesive agent, an antireflection film or the like exists between the scattering layer 30 and the transmission layer 40. The antireflection film can be, for example, an optical film having a function of preventing reflection of the light Lt at the interface f50.

The "interface" is a boundary where a certain uniform phase adjoins a different uniform phase. Further, a "surface" is an interface when the "different uniform phase" is a gas or a vacuum. For example, in case where the diffusive body 20 is solid matter, the surface of the diffusive body 20 is an outer peripheral surface (outermost surface) of the diffusive body 20.

Figure 16:
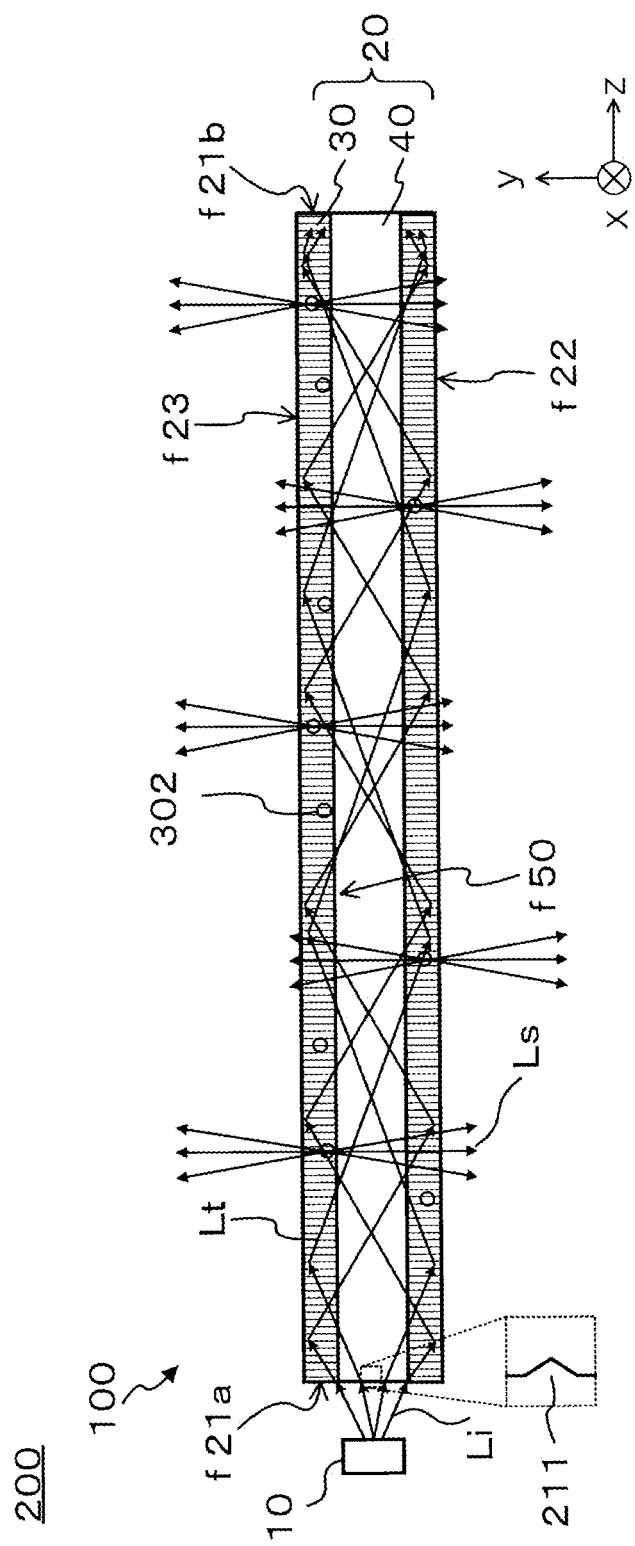
FIG. 16 is an explanatory diagram showing an example of the light guiding of the light Li and the generation of the light Ls in the diffusive body according to the first embodiment.
Figure 17:
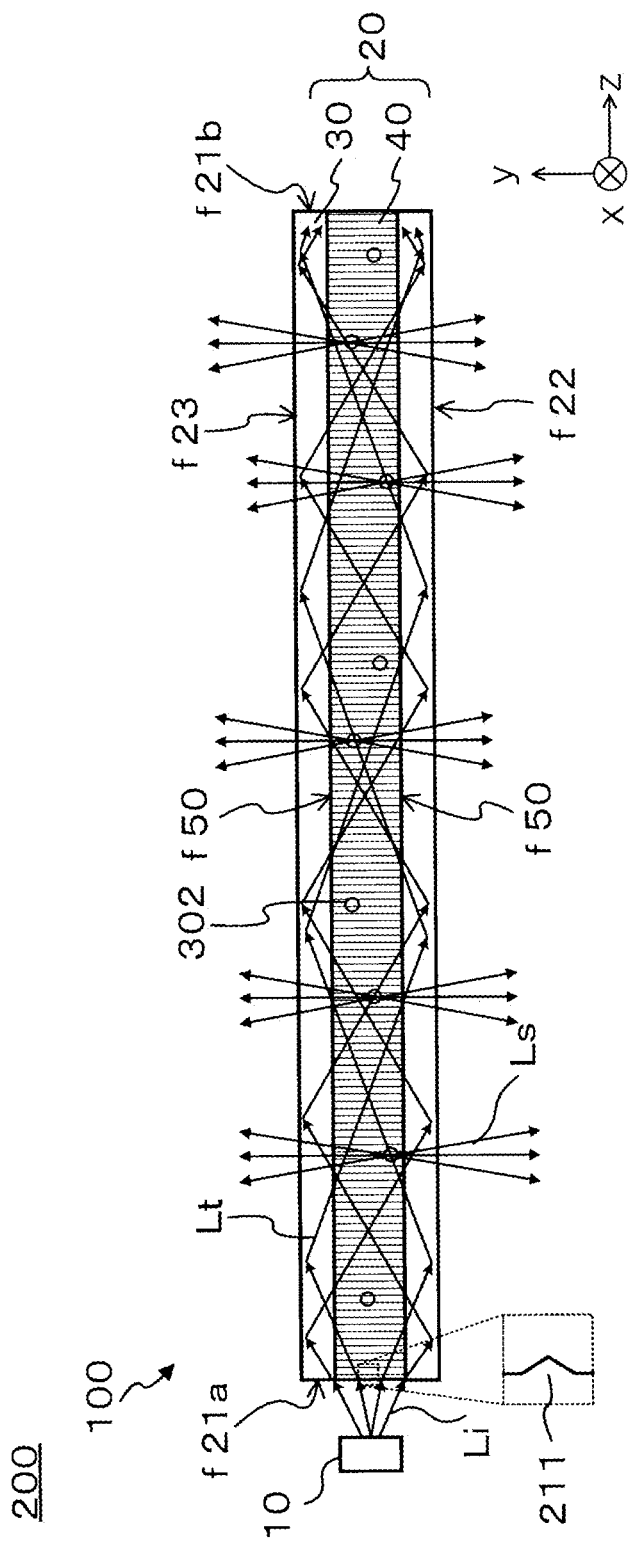
FIG. 17 is an explanatory diagram showing an example of the light guiding of the light Li and the generation of the light Ls in the diffusive body according to the first embodiment.

Incidentally, the interface f50 is not limited to one interface f50. For example, two or more interfaces f50 may exist in the diffusive body 20 in case such as when the scattering layer 30 and the transmission layer 40 form a multilayer structure of three or more layers as illustrated in FIG. 16 and FIG. 17 which will be explained later. Even in such case, the scattering layer 30 and the transmission layer 40 are regarded as being optically connected to each other at each interface f50. In the following description, interfaces existing between the scattering layer 30 and the transmission layer 40 are collectively referred to as the interface f50.

To inhibit the reflection of the light Lt at the interface f50, a refractive index difference between the members forming the interface f50 (in the illustrated example, between the member forming the scattering layer 30 and the member forming the transmission layer 40) is desired to be small.

As an example, the refractive index difference between the member forming the scattering layer 30 and the member forming the transmission layer 40 at the D line (wavelength: 587.56 nm) is 0.5 or less. Incidentally, the refractive index difference is preferably 0.35 or less, more preferably 0.2 or less, and still more preferably 0.05 or less. Here, the "refractive index of the member forming the scattering layer 30" can be paraphrased as the refractive index of the base material 301. Similarly, in case where the member forming the transmission layer 40 includes not only the aforementioned transparent material (hereinafter referred to as a "base material 401") but also particles, an additive or the like, the "refractive index of the member forming the transmission layer 40" can be paraphrased as the refractive index of the base material 401. This is because the "uniform phase" in the part forming the interface f50 can be considered to be mainly made up of the base material in the member forming each layer. Therefore, the aforementioned refractive index difference can also be the refractive index difference between the base material 301 and the base material 401 at the D line (wavelength: 587.56 nm).

Incidentally, in case where a partition member exists between the scattering layer 30 and the transmission layer 40, the aforementioned refractive index difference may be paraphrased as the refractive index difference between the partition member and the member forming the scattering layer 30 and the refractive index difference between the partition member and the member forming the transmission layer 40.

Further, to inhibit the reflection of the light Lt at the interface f50, a refractive index ratio R=ns/nt between the member forming the scattering layer 30 and the member forming the transmission layer 40 at the D line (wavelength: 587.56 nm) may be set at 1 or higher, for example. Here, ns represents the refractive index of the member forming the scattering layer 30 at the D line, and nt represents the refractive index of the member forming the transmission layer 40 at the D line.

In a configuration other than the configuration shown in FIG. 7, the refractive index ratio R=ns/nt may be paraphrased as a ratio R=n2/n1. Here, n1 represents the refractive index of a first member situated on an incidence side of the interface f50 where principal light Lt arrives first, at the D line, and n2 represents the refractive index of a second member situated on an exit side of the interface f50 at the D line. Incidentally, the "principal" light Lt means, in case where the incidence surface includes an end part of the scattering layer 30 and an end part of the transmission layer 40, first light Lt or second light Lt whose light amount is higher between the first and second light Lt, where the first light Lt represents light directly entering the transmission layer 40 and guided therein and the second light Lt represents light directly entering the scattering layer 30 and guided therein.

For example, when more light Li enters the transmission layer 40 compared to the scattering layer 30 and "the light amount of the first light Lt> the light amount of the second light Lt" holds, the principal light Lt is regarded as the first light Lt. In that case, the first member situated on the incidence side when the first light Lt first arrives at the interface f50 is the transmission layer 40, and the second member situated on the exit side is the scattering layer 30. Incidentally, even in the configuration shown in FIG. 7, in case where the member (first member) on the incidence side of the interface f50 where the principal light Lt arrives first is not the transmission layer 40, it is possible to either employ the ratio R=n2/n1 according to the above-described definition or employ the ratio R=ns/nt after configuring the diffusive body 20 so that the light Li does not directly enter the scattering layer 30 as will be described later.

Figure 8:
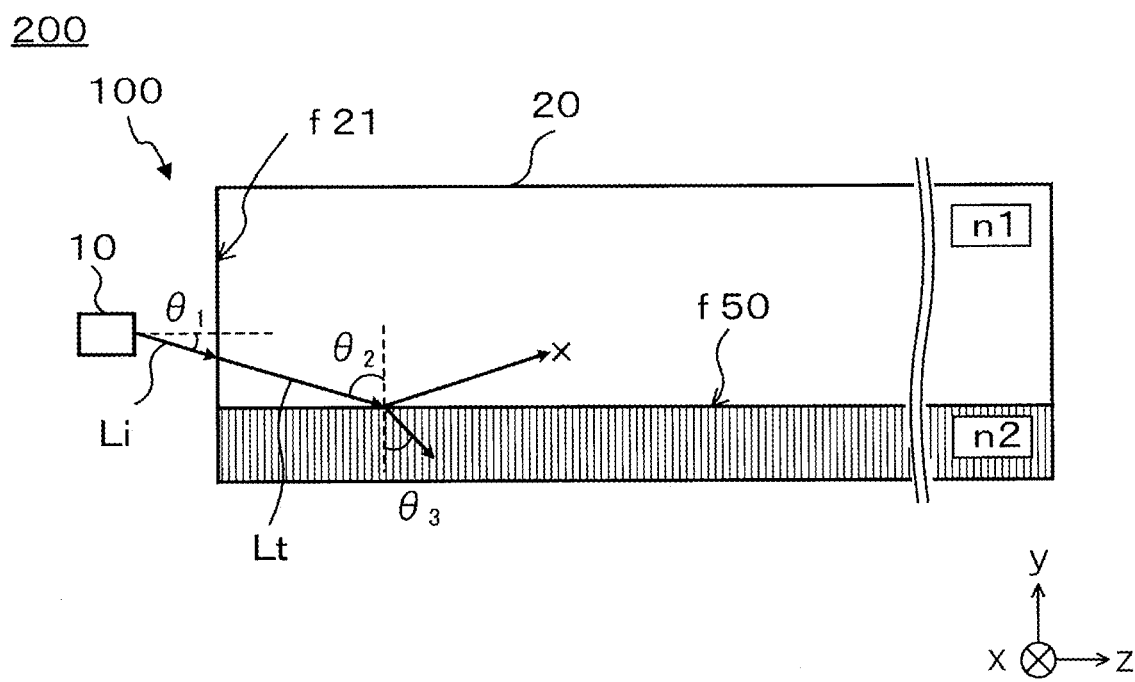
FIG. 8 is an explanatory diagram showing the relationship between an incidence angle $\theta_2$ and an exit angle $\theta_3$ of light at an interface in a multilayer structure of two layers.

FIG. 8 is an explanatory diagram showing the relationship between an incidence angle $\theta_2$ and an exit angle $\theta_3$ of the light Lt at the interface f50 in a multilayer structure of two layers. FIG. 8 also shows the relationship between an incidence angle $\theta_1$ of the light at the end face of the multilayer structure and the incidence angle $\theta_2$ at the interface. In the example shown in FIG. 8, when the light Lt heads from a first layer where the refractive index =n1 towards a second layer where the refractive index=n2, if $\theta_2$ exceeds the total reflection angle, the light Lt is reflected at the interface and propagates in the first layer alone.

If the refractive index (n1) of the first member (the aforementioned first layer) at the first interface f50 is lower than the refractive index (n2) of the second member (the aforementioned second layer), namely, if n1<n2, the total reflection condition of the incidence angle $\theta_2$ in the case of n1→n2 is eliminated and the light does not undergo the total reflection irrespective of the angle of incidence. However, since Fresnel reflection occurs depending on the incidence angle $\theta_2$, the refractive index difference between the two members are desired to be small, and accordingly, the ratio R is also desired to be not too high. The upper limit of the ratio R is 1.37, for example. Namely, the ratio R is desired to be less than or equal to 1.37. Preferably, the ratio R is less than or equal to 1.2.

The lower limit of the ratio R is 0.89, for example. Therefore, the ratio R may be set to satisfy 0.89≤R≤1.37. Incidentally, the ratio R is preferably 0.95 or higher, and more preferably 1 or higher. By setting the ratio R as above, it is possible to prevent the light Lt from propagating in the first layer alone or to reduce the light amount of such light Lt.

Figure 9A:
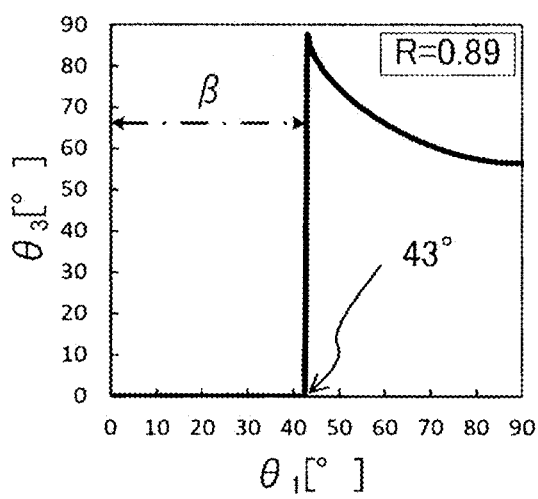
FIGS. 9A to 9D are graphs showing the relationship between $\theta_1$ and $\theta_3$ in regard to each refractive index ratio R of the multilayer structure shown in FIG. 8.
Figure 9B:
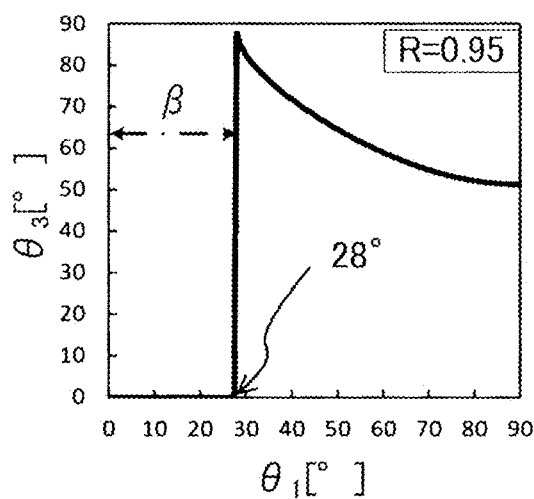
Figure 9C:
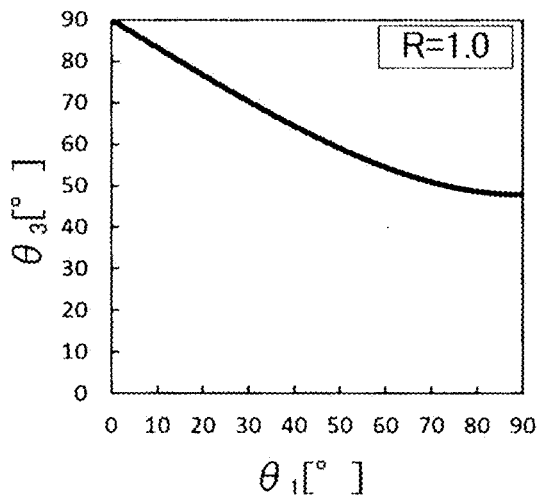
Figure 9D:
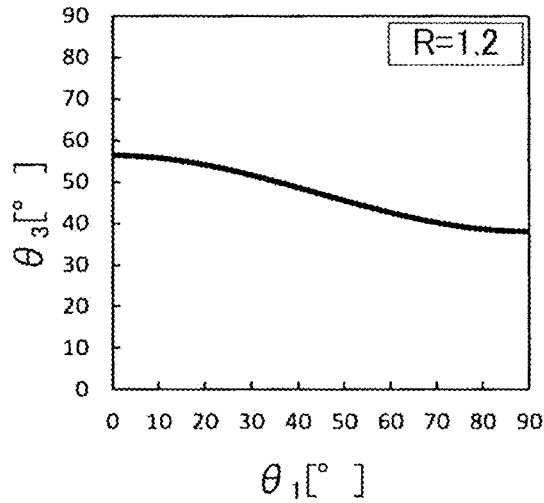

FIGS. 9A to 9D are graphs showing the relationship between $\theta_1$ and $\theta_3$ in regard to each refractive index ratio R of the multilayer structure shown in FIG. 8. Specifically, FIG. 9A is a graph showing the relationship between $\theta_1$ and $\theta_3$ when the ratio R=0.89. FIG. 9B is a graph showing the relationship between $\theta_1$ and $\theta_3$ when the ratio R=0.95. FIG. 9C is a graph showing the relationship between $\theta_1$ and $\theta_3$ when the ratio R=1.0. FIG. 9D is a graph showing the relationship between $\theta_1$ and $\theta_3$ when the ratio R=1.2.

Incidentally, in the examples shown in FIG. 9, n1 is assumed to be 1.49 when obtaining the relationship between $\theta_1$ and $\theta_3$. As shown in FIGS. 9C and 9D, when the ratio R≥1, irrespective of the incidence angle $\theta_1$ of the light Li, the light Lt theoretically enters the second layer without undergoing the total reflection in the first layer as long as the light Lt arrives at the interface f50. In contrast, as shown in FIGS. 9A and 9B, when the ratio R<1, with the decrease in the ratio R, an angle range of the incidence angle $\theta_1$ of the light Li for preventing the light Lt from undergoing the total reflection at the interface f50 (angle range excluding an angle range indicated by the reference character β in the graph) narrows. The reference character β in FIG. 9 indicates an angle range of $\theta_1$ in which the light Lt undergoes the total reflection at the interface f50.

For example, in the example shown in FIG. 9A, in the case where the ratio R=0.89, light included in the light Li and incident at an angle less than 43° with respect to the normal direction of the incidence surface undergoes the total reflection at the interface f50. Therefore, the light source 10 needs to emit light Li including at least a component that is incident at an incidence angle larger than or equal to 43°. Further, in the example shown in FIG. 9B, for example, in the case where the ratio R=0.95, light included in the light Li and incident at an angle less than 28° with respect to the normal direction of the incidence surface undergoes the total reflection at the interface f50. Therefore, the light source 10 needs to emit light Li including at least a component that is incident at an incidence angle larger than or equal to 28°. In such case, it is also possible to increase the amount of the light Lt capable of avoiding the total reflection condition by inclining the optical axis of the light source 10 or by providing a lens between the light source 10 and the incidence surface f21 to change the light distribution of the light Li.

In contrast, when the ratio R≥1 as shown in FIGS. 9C and 9D, there exists no angle range of $\theta_1$ in which the light Lt undergoes the total reflection at the interface f50. Therefore, the angle range of the incidence angle $\theta_1$ of the light Li can be determined by considering only a total reflection condition at the main surface. However, when the ratio R>1, there is a possibility that part of light that directly entered the second layer (a high refractive index material layer in this case) cannot enter the first layer and propagates in the second layer alone. If the second layer is thin, the existence of such stray light may be neglected. Nevertheless, it is also possible, for example, to employ a configuration described below to prevent the light from directly entering the high refractive index material layer or to let the light Li be incident within an appropriate angle range.

Figure 10A:
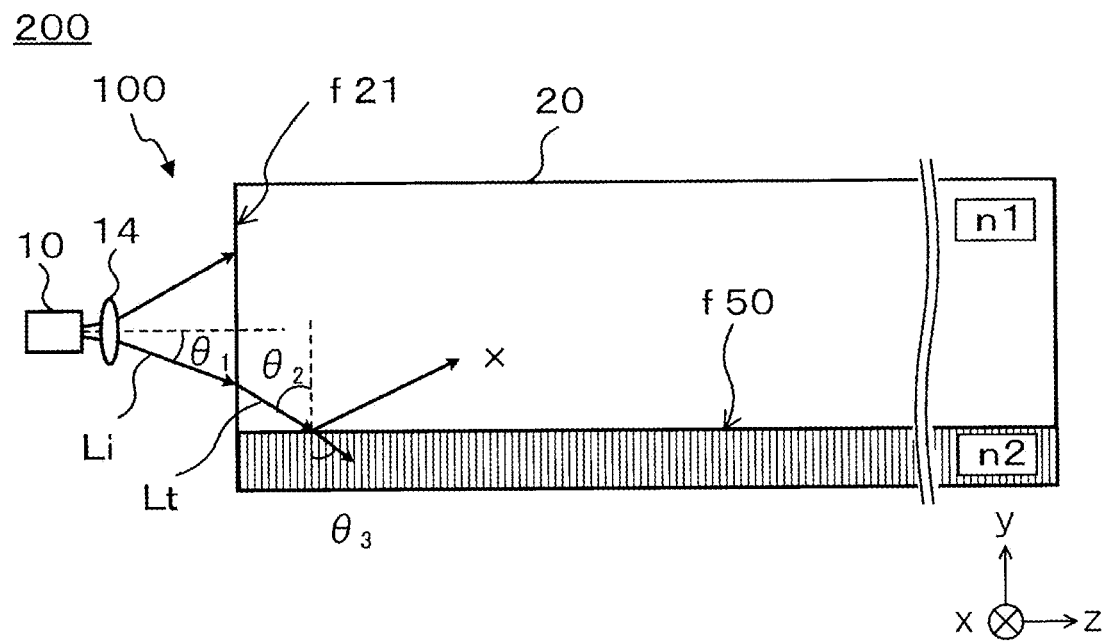
FIGS. 10A and 10B are explanatory diagrams showing other examples of the illumination device according to the first embodiment.
Figure 10B:
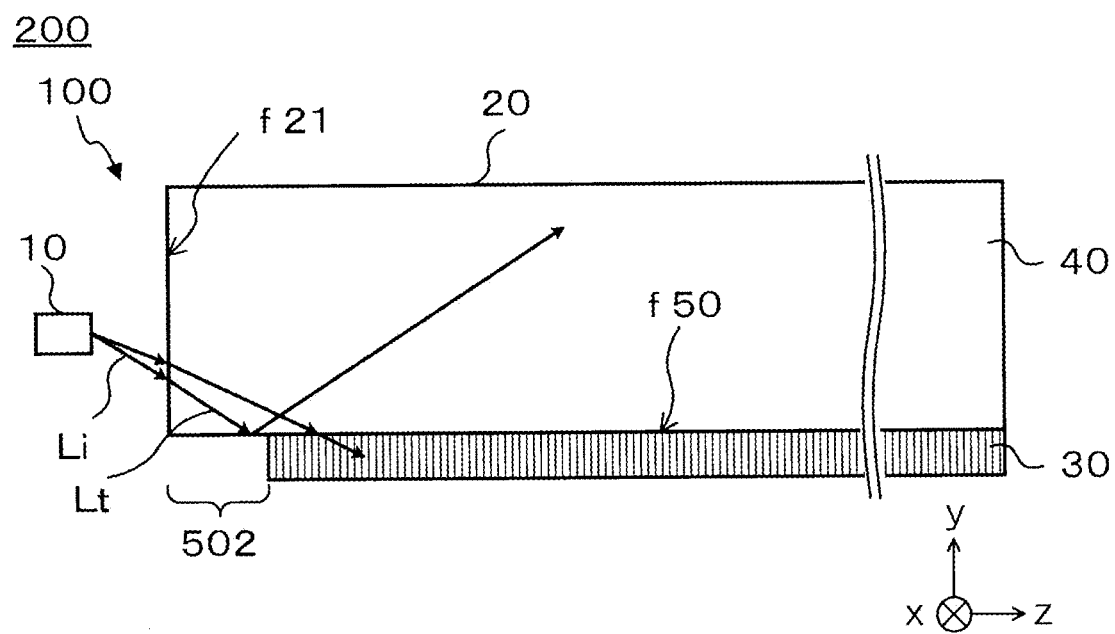

As an example, it is possible to incline the optical axis of the light source 10 so that the light Li enters only a low refractive index material layer. As another example, as shown in FIG. 10A, it is possible to provide a lens 14 between the light source 10 and the diffusive body 20 and thereby change the light distribution of the light Li from the light source so that the light Li enters only the low refractive index material layer. The lens 14 has a function of changing a divergence angle of the light Li emitted from the light source 10, for example. Incidentally, the lens 14 may also be provided integrally with the light emission surface f1b (end part facing the incidence surface of the diffusive body 20) of the light source 10. Further, as another example, it is possible to bring only an incidence end (side face or the like on the light source's side) of the low refractive index material layer close to the light source 10. In this case, when the transmission layer 40 is the low refractive index material layer, the transmission layer 40 and the scattering layer 30 may be designed to differ from each other in the length in the z-axis direction as shown in FIG. 10B. More specifically, a region on which the scattering layer 30 is not stacked (reference character 502 in FIG. 10B) may be formed in an end part of a main surface of the transmission layer 40 on the incidence surface's side.

Incidentally, in case where the partition member exists between the scattering layer 30 and the transmission layer 40, similarly to the case of the refractive index difference, the aforementioned ratio R may be paraphrased as the refractive index ratio between the partition member and the member forming the scattering layer 30 and the refractive index ratio between the partition member and the member forming the transmission layer 40. In this case, the ratio between the refractive index of the member on the incidence side and the refractive index of the member on the exit side may be obtained in regard to each pair of members forming an interface.

As a multilayer structure of the scattering layer 30 and the transmission layer 40, the diffusive body 20 may be made by coating the member forming the transmission layer 40 (e.g., the base material 401) with the member forming the scattering layer 30 (e.g., the base material 301 including the particles 302), for example. As an example of the coating, the base material 401 may be coated with a thin film including the particles 302. As another example, it is possible to coat the base material 401 with a solution containing a material as the base material of the member forming the scattering layer 30 by dip coating or spin coating and thereafter perform a hardening process such as heating or light irradiation. Incidentally, the aforementioned coating can include dip coating or spin coating in the sol-gel method.

As an example, the diffusive body 20 may be made by coating one or both of the two main surfaces of a plate-shaped member forming the transmission layer 40 with the member forming the scattering layer 30. The diffusive body 20 may also be made by coating one or both of the two main surfaces of a plate-shaped member forming the scattering layer 30 with the member forming the transmission layer 40. The diffusive body 20 may also be made by coating one or both of the outer surface and the inner surface of the side face of a rod-shaped member forming the transmission layer 40 with the member forming the scattering layer 30. The diffusive body 20 may also be made by coating one or both of the outer surface and the inner surface of the side face of a rod-shaped member forming the scattering layer 30 with the member forming the transmission layer 40. Incidentally, in case of a multilayer structure of three or more layers, such a coating process may be performed repeatedly.

Further, the diffusive body 20 may also be made by bonding the member forming the transmission layer 40 and the member forming the scattering layer 30 together by using an adhesive agent or the like, for example. Here, the adhesive agent is an optical adhesive agent, for example.

As an example, the diffusive body 20 may be made by bonding a film-like member (e.g., optical film with a thickness less than or equal to 0.5 mm) as the member forming the scattering layer 30 to one or both of the main surfaces of a plate-shaped member forming the transmission layer 40. The diffusive body 20 may also be made by bonding a film-like member as the member forming the transmission layer 40 to one or both of the main surfaces of a plate-shaped member forming the scattering layer 30. The diffusive body 20 may also be made by bonding a film-like member as the member forming the scattering layer 30 to the side face (outer surface of the side face in case of a hollow body) of a rod-shaped member forming the transmission layer 40. The diffusive body 20 may also be made by bonding a film-like member as the member forming the transmission layer 40 to the side face (outer surface of the side face in case of a hollow body) of a rod-shaped member forming the scattering layer 30. Incidentally, in case of a multilayer structure of three or more layers, such a film bonding process may be performed repeatedly.

Incidentally, in case where the scattering layer 30 and the transmission layer 40 exhibit fluidity, the diffusive body 20 can include a container that stores the scattering layer 30 and the transmission layer 40. For example, the container can be either a container that stores the stacked scattering layer 30 and transmission layer 40 in the state of contacting each other as liquids (not mixed together) or a container that includes a partition member provided between the scattering layer 30 and the transmission layer 40 and stores the members of those layers respectively in spaces partitioned by the partition member. Incidentally, the transmission layer 40 may also be configured as a part of a container that stores the scattering layer 30. For example, the diffusive body 20 may have a configuration in which a container formed with the member forming the transmission layer 40 is filled in with the member forming the scattering layer 30.

Further, the diffusive body 20 may be made by performing concavity/convexity formation processing on the nanometer order on the surface of the base material 301 forming the scattering layer 30, for example. In this case, in the thickness direction of the base material 301, it is possible to regard a region from the surface that underwent the concavity/convexity formation processing as the scattering layer 30 and regard the other region as the transmission layer 40. In that case, the transmission layer 40 is formed with the base material 301.

Further, as a component other than the transmission layer 40 and the scattering layer 30, the diffusive body 20 may include a light-transmissive functional coating provided on at least one surface, such as an antireflection coating, an antifouling coating, a heat shield coating or water-repellent processing. Furthermore, in consideration of functionality (shock resistance, water resistance, heat resistance, etc.) required of an illumination device that is usable for a window function by taking advantage of its low-profile shape, transparency and light permeability when the light is off, etc. or an illumination device used in a bathroom or the like, the diffusive body 20 may have a configuration in which the diffusive body 20 is sandwiched between two transparent members (e.g., glass plates), for example. In this case, either an intermediate layer between the pair of glass plates or the multilayer structure including the pair of glass plates can be regarded as the diffusive body 20. In the former case, the diffusive body 20 as the multilayer structure of the transmission layer 40 and the scattering layer 30 can be considered to be further provided with a transparent member on each of the first surface and the second surface of the diffusive body 20. In contrast, in the latter case, it is possible to regard the pair of glass plates as transmission layers 40 and consider the diffusive body 20 to have a configuration in which the scattering layer 30 is sandwiched between the two transparent members forming the transmission layers 40.

Figure 11:
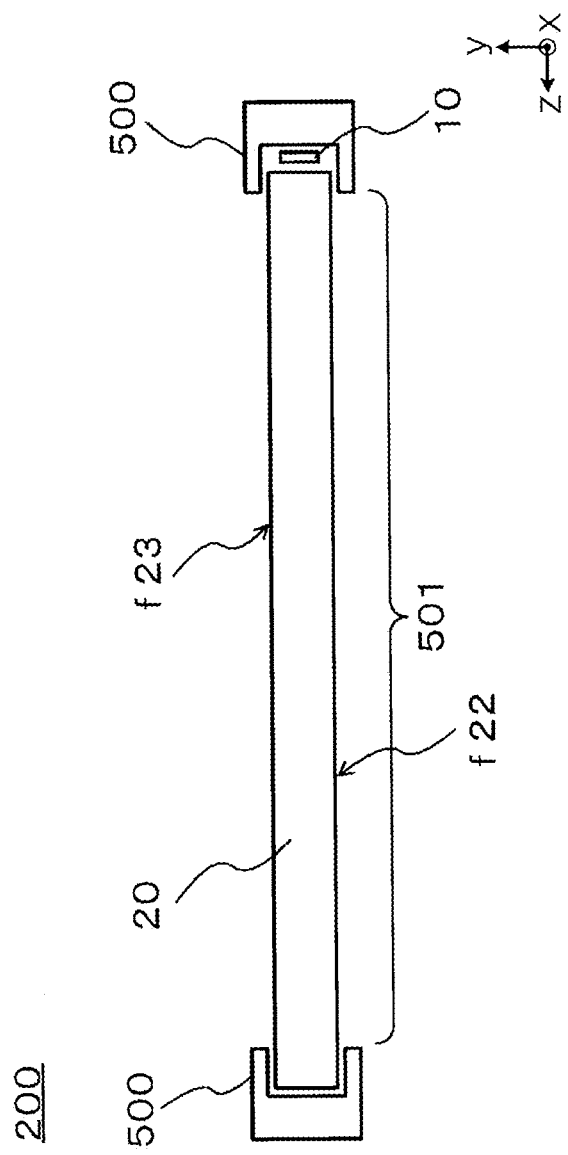
FIG. 11 is an explanatory diagram showing an example of a frame body according to the first embodiment.

Incidentally, in case where both of the window function and the illumination function are achieved, the frame body is desired to be formed to be open in at least a part of the region on the first surface of the diffusive body 20 where the main light emission surface is formed and in a corresponding region on the second surface (see FIG. 11). Incidentally, the reference character 501 in FIG. 11 represents the region on the surface f22 of the diffusive body 20 where the main light emission surface is formed, and the reference character 500 represents the frame body. In this example, the frame body 500 has an opening corresponding to the region 501 (hereinafter referred to also as an "opening 501") not only on the front surface f22 but also on the back surface f23.

Further, as shown in FIG. 2, the end face f21 forming the incidence surface can include an end face f31 of the scattering layer 30 and an end face f41 of the transmission layer 40. In that case, the incidence surface may be formed on the end face f31 of the scattering layer 30, on the end face f41 of the transmission layer 40, or on the end face f31 of the scattering layer 30 and the end face f41 of the transmission layer 40. In other words, the light Li may enter the diffusive body 20 through the end face f31 of the scattering layer 30 of the diffusive body 20, through the end face f41 of the transmission layer 40 of the diffusive body 20, or through the region of the diffusive body 20 including the end face f31 of the scattering layer 30 and the end face f41 of the transmission layer 40. In either case, it is permissible if the diffusive body 20 is configured to let the light Li enter at least an end part of the scattering layer 30 or the transmission layer 40 via a member forming the incidence surface.

Further, the diffusive body 20 may have a light guide end face at which the light Lt arrives (e.g., surface f21b in FIG. 7) on the side opposite to the end face where the incidence surface is formed. For example, the light guide end face may be formed on an end face on the side opposite in the z-axis direction to the end face where the incidence surface is formed. Similarly to the incidence surface, the light guide end face can include one or both of a surface of the scattering layer 30 and a surface of the transmission layer 40.

((Shape of Diffusive Body 20))

Next, some examples will be shown in regard to the shape of the diffusive body 20. The diffusive body 20 is in a plate-like shape, for example. Incidentally, the plate-like shape is not limited to a flat plate-like shape. Specifically, the plate-like shape can be a shape having a curved main surface or an inclined main surface. For example, in the diffusive body 20, one or both of the front surface f22 and the back surface f23 (the first surface and the second surface) can be in a curved shape. In case where the front surface f22 and the back surface f23 are curved, the directions of the curvatures of the two surfaces may either coincide or not coincide with each other. For example, the two surfaces may be curved surfaces of the convex type (shape that is convex outward). Further, the two surfaces may be curved surfaces of the concave type (shape that is convex inward), for example. Furthermore, it is also permissible even if one of the two surfaces is a curved surface of the convex type and the other surface is a curved surface of the concave type, for example. The above-described relationship between the front surface f22 and the back surface f23 is applicable also as the relationship between side faces facing each other, for example. Further, surfaces (including the main surfaces) of the diffusive body 20 can include an inclination, a step, a concavity, a convex part or the like.

The diffusive body 20 is in a rod-like shape, for example, as already described earlier. Incidentally, the rod-like shape is not limited to a shape like that shown in FIG. 6 in which the diameter or the length around the trunk (outer edge in the cross-sectional shape of the side face) is constant in an extending direction of the columnar body. Here, the extending direction of the columnar body is, for example, the z-axis direction in the case where one of the bases of the columnar body is defined as the surface f21a in FIG. 6, that is, the so-called height direction of the columnar body. Incidentally, the rod-like shapes can include a shape corresponding to a plate-like shape. In that case, a rod-like shape in which the bases of the columnar body correspond to the main surfaces of a plate-like shape and at least one of the bases is used as the main light emission surface may be regarded as a plate-like shape. Also in this case, from the viewpoint of the thinning, the length of the diffusive body 20 in the thickness direction (y direction) is designed to be smaller than the length of the diffusive body in the light guide direction of the light Lt (z direction).

In the case where the diffusive body 20 is in the rod-like shape, the extending direction of the columnar body is defined as the z-axis direction. The y-axis direction as the axial direction parallel to the main emission direction is defined as a normal direction of the side face of the columnar body (the main surface of the diffusive body 20). Therefore, the main light emission surface is assumed to be at least a part of the side face of the columnar body. Further, the incidence surface is assumed to be at least one of the bases of the columnar body.

The shape of the diffusive body 20 in a top view (the shape on an xz plane in the drawings, hereinafter referred to as a front shape) is not particularly limited. For example, the front shape of the diffusive body 20 can be a rectangular shape, a polygonal shape, a circular shape, a barrel shape, a spool shape, a different shape formed by connecting two or more straight lines, a shape formed by connecting two or more arcs, a shape formed by connecting one or more straight lines and one or more arcs, or the like.

Further, the shape of the diffusive body 20 in a side view (the shape on an xy plane or a yz plane in the drawings, hereinafter referred to as a side shape) is also not particularly limited. For example, the side shape of the diffusive body 20 can be a rectangular shape, a barrel shape, a spool shape, the other shape formed by connecting four or more straight lines including two straight lines facing each other, a shape formed by connecting two or more straight lines including two straight lines facing each other and two or more arcs, or the like. Here, it should be noted that the side face of the shape as the "diffusive body" does not necessarily coincide with the side face of the shape as viewed as the "columnar body" (side face of a standard columnar body).

In the following, the diffusive body 20 according to the first embodiment will be described assuming that the diffusive body 20 is in the plate-like shape as an example.

The light Li emitted by the light source 10 is incident upon the side face f21 (end face). The side face f21 is arranged to face the light emission surface f11 of the light source 10, for example.

The front surface f22 (first surface) emits the light Ls scattered by the particles 302. The front surface f22 may also emit the light Lt guided in the diffusive body 20. For example, light guided in the diffusive body 20 and arriving at an end part opposing the incidence surface may be deflected by the end part or the like and emitted from the front surface f22 as light reproducing the sunlight.

Further, the back surface f23 (second surface) may emit the light Ls scattered by the particles 302. The back surface f23 may also emit the light Lt guided in the diffusive body 20. For example, light guided in the diffusive body 20 and arriving at the end part opposing the incidence surface may be deflected by the end part or the like and emitted from the back surface f23 to the outside for the purpose of preventing stray light.

The back surface f23 faces the front surface f22. The light Lt after entering the diffusive body 20 is guided by the reflection by the front surface f22 and the back surface f23. The light Lt is guided by means of total reflection, for example. For example, the light Lt is guided in the diffusive body 20.

It is also possible for a surface other than the front surface f22 or the back surface f23 (e.g., side face) to emit the light Ls scattered by the particles 302. The surface other than the front surface f22 or the back surface f23 (e.g., side face) may also emit the light Lt guided in the diffusive body 20.

FIG. 12 to FIG. 14 are explanatory diagrams showing examples of the diffusive body 20. In the examples in the diagrams, a curvature or an inclination angle in the shape can be exaggerated compared to the real value. As shown in FIG. 12A, the diffusive body 20 can be in a flat plate-like shape, for example. Here, the flat plate-like shape is a shape having two flat surfaces (the surface f22 and the surface f23 in FIG. 12A) facing each other and connected to each other by side faces.

Figure 12A:
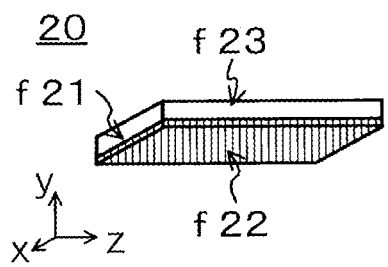
FIGS. 12A to 12H are explanatory diagrams showing examples of the diffusive body according to the first embodiment.
Figure 12B:
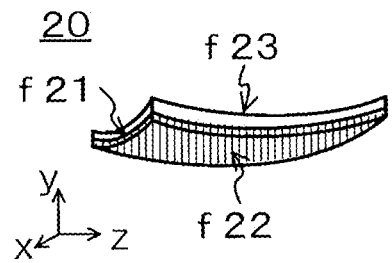
Figure 12C:
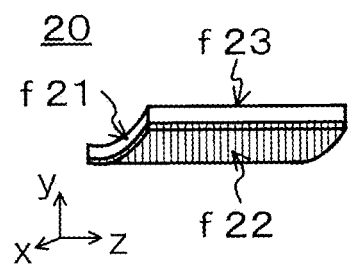

Incidentally, the plate-like shape is not limited to the flat plate-like shape. For example, one or both of the first surface and the second surface of the diffusive body 20 may be curved. For example, in the diffusive body 20, it is permissible even if one of the first surface and the second surface is a curved surface of the convex type (convex outward) and the other surface is a curved surface of the concave type (convex inward) (see FIGS. 12B to 12E). The examples shown in FIGS. 12B and 12C are examples of the diffusive body 20 in the plate-like shape in which the surface f22 where the main light emission surface is formed is curved in the convex type and the surface f23 on the opposite side is curved in the concave type. Specifically, FIG. 12B shows an example of a shape having a curvature in an xy cross section and in a yz cross section and FIG. 12C shows an example of a shape having a curvature only in the xy cross section. In the example shown in FIG. 12B, the curvature in the xy cross section and the curvature in the yz cross section may be either the same as each other or different from each other.

While illustration is left out, the diffusive body 20 can also be configured to have a curvature in the yz cross section and have no curvature in the xy cross section. Such a configuration corresponds to a configuration obtained by rotating the example shown in FIG. 12C by 90° on an xz plane to change the position of the incidence surface. In regard to the above-described conditions that there is no particular limitation on whether the in-plane curvatures are the same or different and the position of the incidence surface can be changed, the same goes for other examples.

Figure 12D:
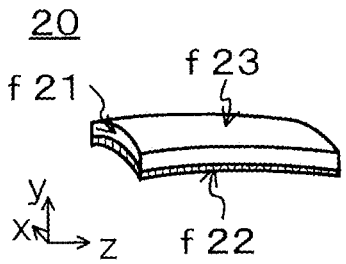
Figure 12E:
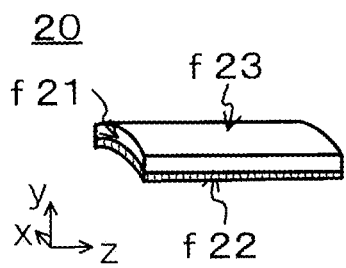
Figure 12F:
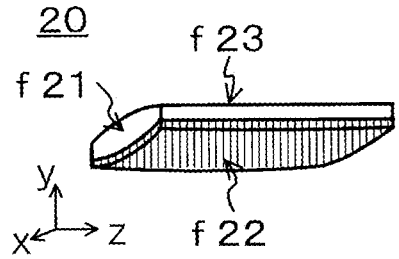

The examples shown in FIGS. 12D and 12E are examples of the diffusive body 20 in the plate-like shape in which the surface f22 where the main light emission surface is formed is curved in the concave type and the surface f23 on the opposite side is curved in the convex type. Specifically, FIG. 12D shows an example of a shape having a curvature in the xy cross section and in the yz cross section and FIG. 12E shows an example of a shape having a curvature in the xy cross section.

Further, in the diffusive body 20, both of the first surface and the second surface may be curved surfaces of the convex type (convex outward) (see FIGS. 12F and 12G), for example. These examples are also examples in which the thickness of the diffusive body 20 in the y-axis direction varies. While illustration is left out, also in the examples shown in FIGS. 12F and 12G, the diffusive body 20 can also be configured to further have a curvature in the yz cross section or to have a curvature only in the yz cross section.

Figure 12G:
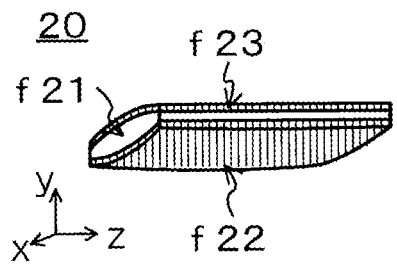

As shown in FIG. 12G, the diffusive body 20 may also be a multilayer structure of three or more layers. In that case, the order of stacking layers is not particularly limited. While the example shown in FIG. 12G is an example of stacking a scattering layer 30 having a constant thickness on each of the two main surfaces of the transmission layer 40 whose thickness is not constant, it is also possible, for example, to stack a scattering layer 30 whose thickness is not constant on each of the main surfaces of the transmission layer 40 having a constant thickness.

Figure 12H:
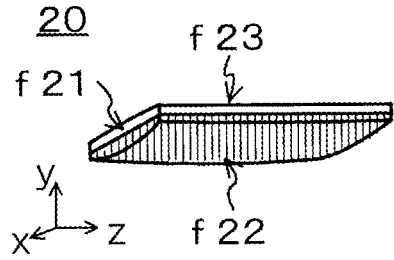

Further, as shown in FIG. 12H, in the diffusive body 20 as a two-layer structure, it is also possible, for example, to stack the scattering layer 30 whose thickness is not constant on one main surface of the transmission layer 40 having a constant thickness. Furthermore, as shown in FIG. 13H which will be explained later, it is also possible to form the diffusive body 20 having a constant thickness by stacking the scattering layer 30 whose thickness is not constant and the transmission layer 40 whose thickness is not constant. As above, the total thickness of the diffusive body 20 and the numbers of times of stacking the scattering layer 30 and the transmission layer 40 and the thickness of each layer in the diffusive body 20 are not particularly limited.

Incidentally, the example shown in FIG. 12H is also an example in which the second surface is flat and the first surface is curved. As in this example, it is permissible in the diffusive body 20 even if one of the first surface and the second surface is flat and the other surface is curved (see FIGS. 13A to 13F).

Figure 13A:
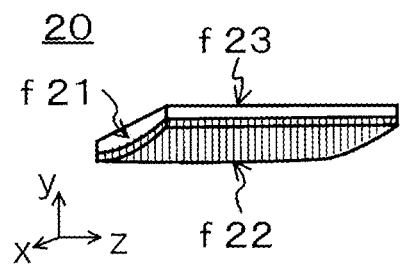
FIGS. 13A to 13H are explanatory diagrams showing examples of the diffusive body according to the first embodiment.
Figure 13B:
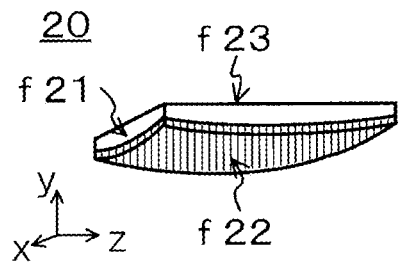

The examples shown in FIGS. 13A to 13D have at least a back surface f23 that is parallel to the xz plane. While the example shown in FIG. 13A is an example in which at least the first surface situated in the −y-axis direction has a curvature in the xy cross section, it is also permissible even if at least the first surface situated in the −y-axis direction has a curvature in the xy cross section and in the yz cross section as in the example shown in FIG. 13B. While illustration is left out, it is also permissible in the diffusive body 20 even if at least the first surface situated in the −y-axis direction has a curvature only in the yz cross section.

Figure 13C:
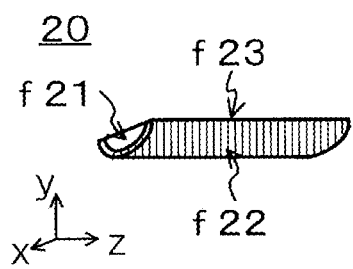
Figure 13D:
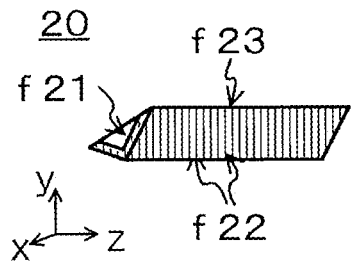
Figure 13E:
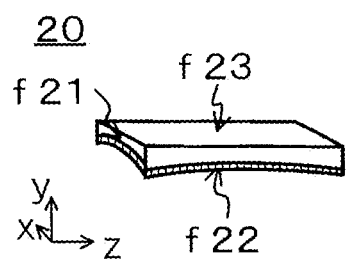

The examples shown in FIGS. 13C and 13D are examples of the diffusive body 20 having a shape obtained by cutting out a surface (side face) of a columnar body so that the second surface situated in the +y-axis direction is flat and the diffusive body 20 has side faces only in the end parts in the z-axis direction. Incidentally, in the examples shown in FIGS. 13C and 13D, the shape after being cut out is also a rod-like shape. In such case, the surface that formed the side face of the columnar body before the cutting out may be regarded as the first surface where the main light emission surface is formed (more specifically, the front surface f22) in the diffusive body 20, and the surface corresponding to the cut surface may be regarded as the second surface (more specifically, the back surface f23).

The examples shown in FIGS. 13A to 13E are also examples in which the front surface f22 includes a surface curved or inclined with respect to a flat back surface f23 as a reference surface. As in these examples, it is also permissible in the diffusive body 20 even if at least one main surface includes a surface curved or inclined with respect to a reference surface.

Here, the reference surface is, for example, a surface that determines the curvature and the inclination of the front surface or the back surface. Specifically, the reference surface can be a surface (an xz plane in the drawing) orthogonal to the main emission direction (−y-axis direction in the drawing). Further, the reference surface is, for example, a surface that determines the curvature or the inclination of the side face. Specifically, the reference surface is a surface (a xy plane in the drawing) orthogonal to a direction (z-axis direction), among directions orthogonal to the main emission direction, that is most closet to the traveling direction of the light entering the light emission body, or a surface (a yz plane in the drawing) orthogonal to those two surfaces.

Incidentally, while the aforementioned reference surface is an example of the reference surface determined with reference to the traveling direction of the light in the diffusive body 20, it is also possible to determine the reference surface with reference to a wall or a ceiling as the installation position of the illumination device 200, for example. For example, the reference surface can be a surface parallel or orthogonal to the surface (installation position surface) of the wall or ceiling as the installation position of the illumination device 200. Incidentally, in case such as when the installation position surface is a curved surface, the reference surface can be a curved surface parallel to the installation position surface, or a cross-sectional surface in the horizontal direction or the vertical direction (in this case, the reference surface is a plane) of a plate-shaped structure, having a constant thickness in the normal direction of the installation position surface, at a position as the center of the main light emission surface after the installation. Incidentally, "a surface of the diffusive body 20 is inclined with respect to the reference surface" means, more specifically, that the length measured in a direction perpendicular to the reference surface is not constant in the surface of the diffusive body 20.

In the diffusive body 20, not only the first surface and the second surface but also the side face(s) may include a curved surface or an inclined surface. Accordingly, not only the length (thickness) of the diffusive body 20 in the y-axis direction but also the length in the x-axis direction and the length in the z-axis direction may be either constant or not constant.

Figure 13F:
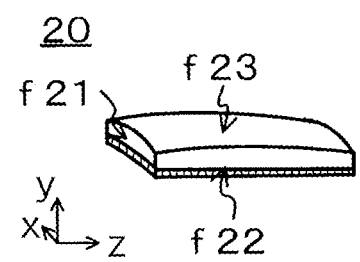

The example shown in FIG. 13F is an example in which the back surface f23 is curved in contrast with a flat front surface f22 as the reference surface. As in this example, it is also permissible in the diffusive body 20 even if the back surface's side is curved or inclined. The same goes for case where the reference surface is an installation surface.

Figure 13G:
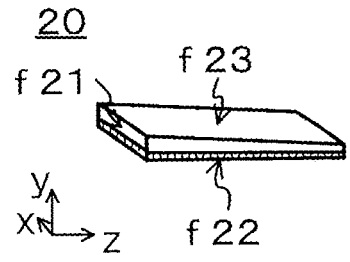
Figure 13H:
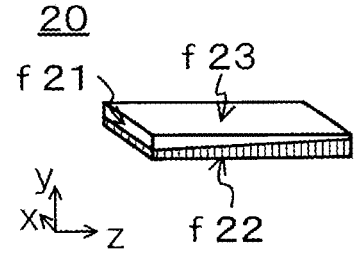

The example shown in FIG. 13G is an example in which the back surface f23 is inclined with respect to a flat front surface f22 as the reference surface. While illustration is left out, it is also permissible in the diffusive body 20 even if the front surface f22 is inclined with respect to a flat back surface f23 as the reference surface.

The example shown in FIG. 13H is an example of forming a diffusive body 20 having a constant thickness by stacking a scattering layer 30 and a transmission layer 40 whose thicknesses is constant. As in this example, the thicknesses of the scattering layer 30 and the transmission layer 40 in the diffusive body 20 are not particularly limited.

Further, the diffusive body 20 may also be in the rod-like shape as shown in FIGS. 14A to 14F, for example. Incidentally, the rod-like shape is not limited to a cylindrical shape like the one shown in FIG. 14A. For example, the rod-like shape can be a prism shape, a barrel shape or a spool shape.

In the case where the diffusive body 20 is in the rod-like shape as shown in FIGS. 14A to 14F, the diffusive body 20 may have layered structure centering at the central axis of the columnar body (hereinafter referred to also as a rod center) and formed towards the outer peripheral direction. In the case where the diffusive body 20 is in the rod-like shape, the incidence surface is formed on at least one of the bases, and the main light emission surface is formed in at least one of side faces of the rod-like shape or in at least a region as a part of the side face.

Figure 14A:
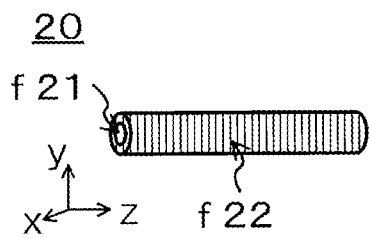
FIGS. 14A to 14F are explanatory diagrams showing examples of the diffusive body according to the first embodiment.
Figure 14B:
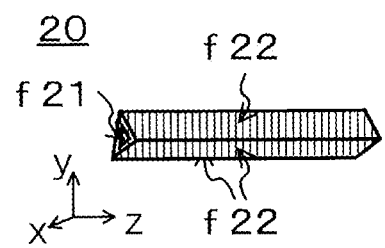
Figure 14C:
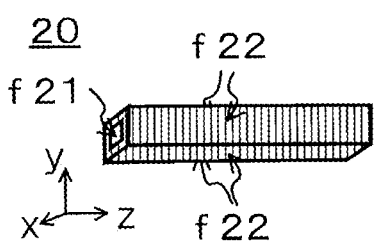
Figure 14D:
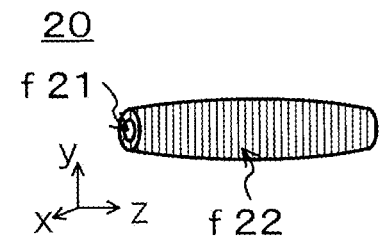
Figure 14E:
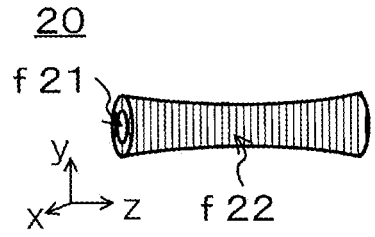

For example, the examples shown in FIGS. 14A to 14C are examples of the diffusive body 20 in a rod-like shape extending in the extending direction with no change from the size of the base, that is, in a rod-like shape in which the size of the xy cross section is constant in the z-axis direction. Specifically, FIG. 14A shows an example in which the cross-sectional shape is a circular shape, FIG. 14B shows an example in which the cross-sectional shape is a triangular shape, and FIG. 14C shows an example in which the cross-sectional shape is a quadrangular shape. The examples shown in FIGS. 14D and 14E are examples of the diffusive body 20 in a rod-like shape in which the side face is curved with respect to a straight line parallel to the rod center. Specifically, FIG. 14D shows an example of the barrel shape, and FIG. 14E shows an example of the spool shape.

While illustration is left out, the rod-like shape can also be hollow. For example, if there is a space in a part at the rod center, the diffusive body 20 takes a hollow rod-like shape. Incidentally, if there is no space in a part at the rod center, the diffusive body 20 takes a solid (non-hollow) rod-like shape.

Figure 14F:
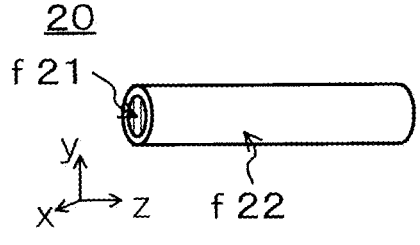

Also in the case of the rod-like shape, stacking three or more layers is possible, and the order of stacking layers and the thickness of each layer are not particularly limited. For example, as illustrated in FIGS. 14A to 14E, the diffusive body 20 may be formed by arranging the transmission layer 40 to be closer to the center and arranging the scattering layer 30 around the transmission layer 40. Alternatively, as illustrated in FIG. 14F, the diffusive body 20 may be formed by arranging the scattering layer 30 to be closer to the center and arranging the transmission layer 40 around the scattering layer 30, for example.

In the above-described examples, the emission direction of the light Ls is not limited to the −y-axis direction. For example, the diffusive body 20 in the plate-like shape can emit the light Ls from the back surface (second surface). Further, the diffusive body 20 in the rod-like shape is capable of emitting the light Ls from all surfaces forming the side face(s) of the columnar body, for example. As above, the diffusive body 20 may have two or more emission directions in the xy plane. For example, the diffusive body 20 can either have all directions in 360 degrees representing a radial pattern in the xy plane as the emission directions or have only some of these directions as the emission directions.

In case like when the diffusive body 20 in the plate-like shape is desired to emit the light from only one of the main surfaces or when the diffusive body 20 in the rod-like shape is desired to emit the light from only a region as a part of the main surface, it is possible to prevent the unnecessary light emission by, for example, providing a light absorber or light reflector (not shown) in a part of a surface of the diffusive body 20, more specifically, in a region on a surface other than the surface or region that is desired to emit the light.

As an example, it is possible to divide a surface of the diffusive body 20 into a region for emitting the light Ls (hereinafter referred to as an emission region) and a region not for emitting the light Ls (hereinafter referred to as a non-emission region) and then cover the non-emission region with the light reflector or light absorber. The same goes for diffusive bodies 20 not in the rod-like shape. In this case, the light reflector or light absorber may be either in contact with the non-emission region or not in contact with the non-emission region. For example, the light reflector or light absorber may be either stacked on the non-emission region of the surface of the diffusive body 20 or provided to face the non-emission region of the surface of the diffusive body 20.

While illustration is left out, part of the light Ls scattered in the scattering layer 30 can turn into light traveling in the diffusive body 20 alternately in the scattering layer 30 and in the transmission layer 40 like the light Lt. In such case, it is assumed that even the light Ls, after turning into light traveling in the diffusive body 20 without being emitted from a surface of the diffusive body 20, is handled as the light Lt.

((Other Light Guide Examples of Light Li in Diffusive Body 20))

Figure 15:
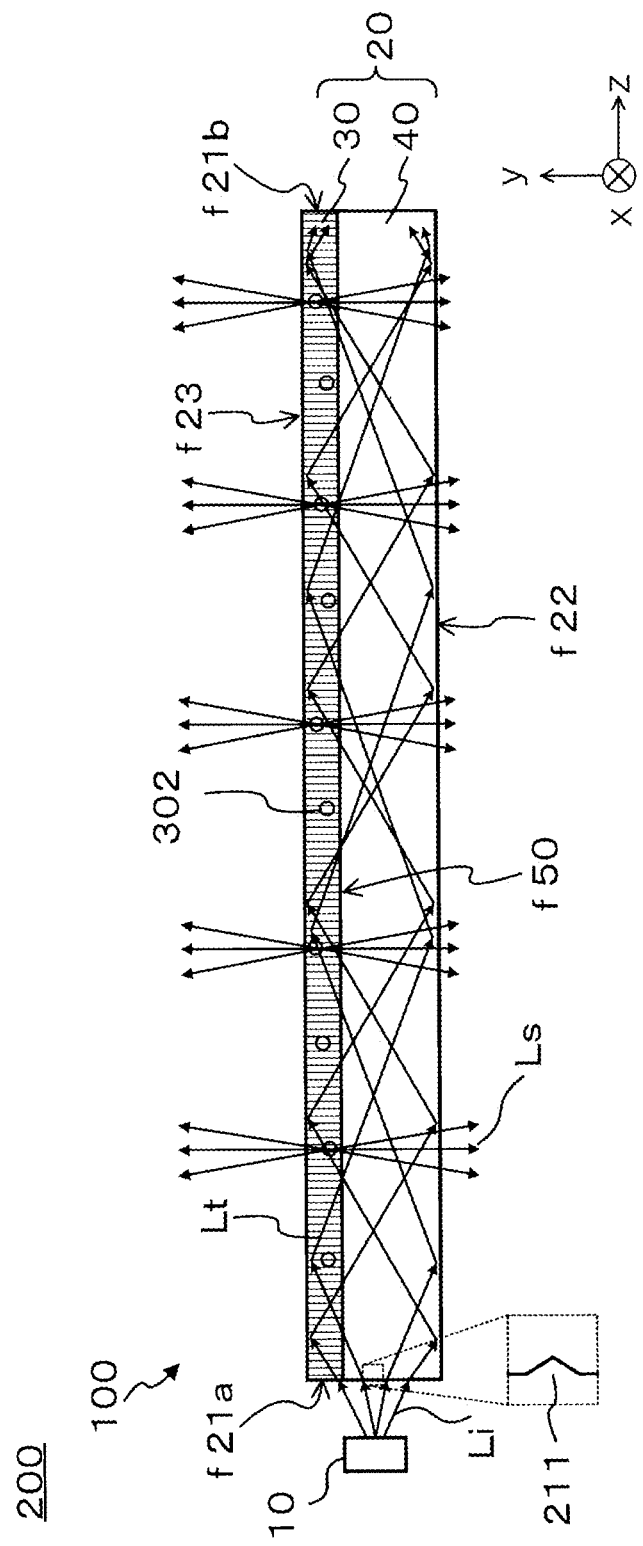
FIG. 15 is an explanatory diagram showing an example of the light guiding of the light Li and the generation of the light Ls in the diffusive body according to the first embodiment.

FIGS. 15 to 17 are explanatory diagrams showing other examples of the light guiding of the light Li and the generation of the light Ls in the diffusive body 20 according to the first embodiment. Specifically, FIG. 15 is an explanatory diagram showing another example of the light guiding of the light Li and the generation of the light Ls in a diffusive body 20 in which the scattering layer 30 is situated on the back surface's side in the yz cross section. FIG. 16 is an explanatory diagram showing another example of the light guiding of the light Li and the generation of the light Ls in a diffusive body 20 in which the transmission layer 40 is arranged between two scattering layers 30 in the yz cross section. FIG. 17 is an explanatory diagram showing another example of the light guiding of the light Li and the generation of the light Ls in a diffusive body 20 in which the scattering layer 30 is arranged between two transmission layers 40 in the yz cross section.

As shown in the drawings, even when the stacking order and the number of stacked layers are different, the light guide paths of the light Li and the principle of the generation of the light Ls are similar to those in the example shown in FIG. 7.

Figure 18:
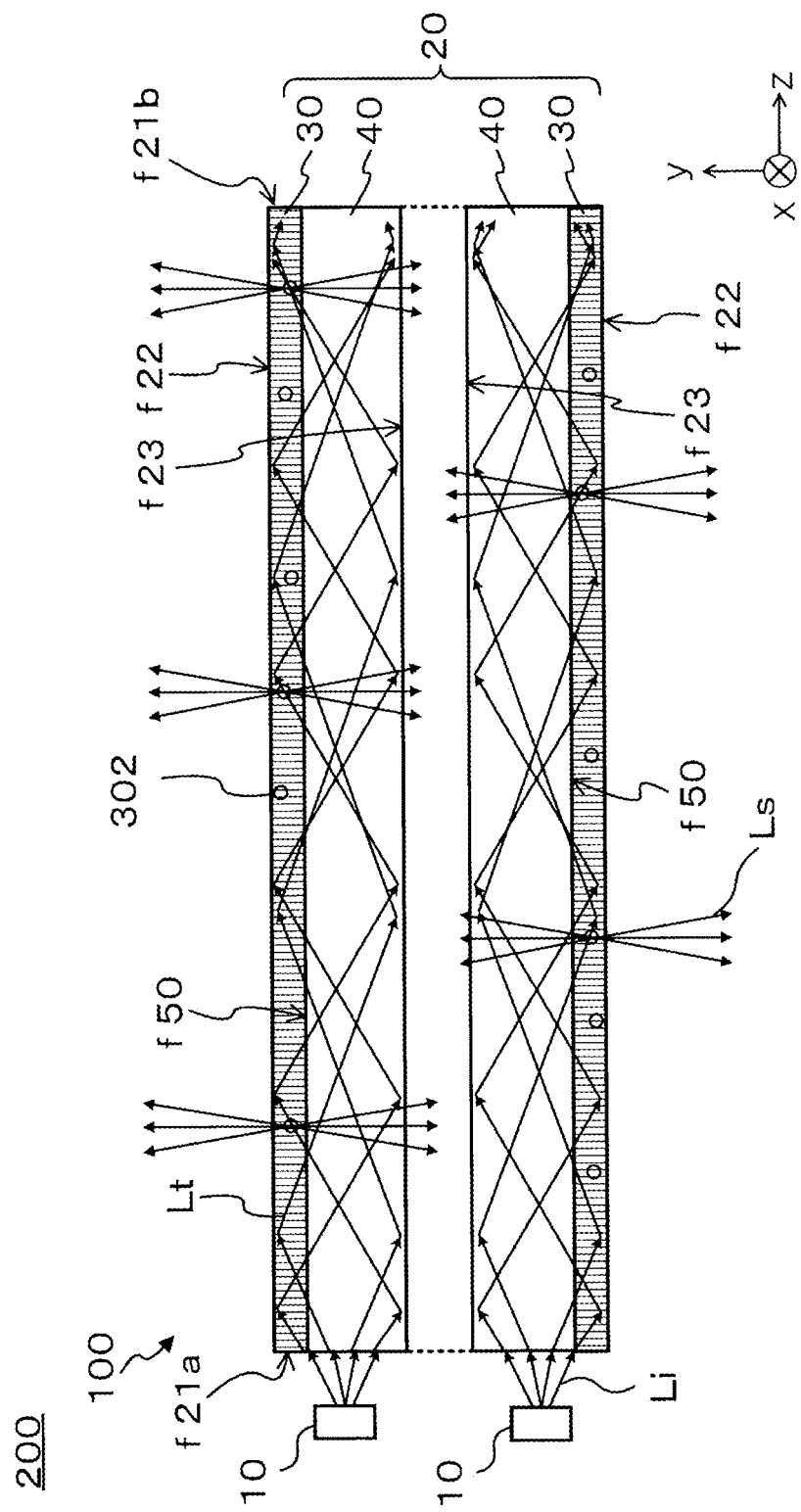
FIG. 18 is an explanatory diagram showing an example of the light guiding of the light Li and the generation of the light Ls in the diffusive body according to the first embodiment.

Incidentally, in case of a hollow rod-like shape, as shown in FIG. 18, the structure in a cross section parallel to the z-axis may be regarded as multilayer structures of the scattering layer 30 and the transmission layer 40, corresponding to two diffusive bodies 20, arranged via a hollow. In that case, the outer surface of the side face of the columnar body is regarded as the front surface f22 (the first surface where the main light emission surface is formed), and the inner surface is regarded as the back surface f23 (second surface). In each of the multilayer structures, light guiding similar to that shown in FIGS. 7 and 10 to 14 may be carried out. Incidentally, while there are cases where the light Ls travels between the multilayer structures facing each other and enters the opposite multilayer structure via the hollow, such light Ls may be emitted from the front surface f22 by traveling in the +y-axis direction or −y-axis direction. The arrangement of the light source 10 is not limited to arranging a plurality of light sources 10 along the outer peripheral shape of the base while avoiding the hollow part of the base as shown in FIG. 18. For example, it is also possible to arrange one light source 10 at the rod center when the size of the hollow part is sufficiently small relative to an irradiation range of the light source 10.
(Effect of Illumination Device 200)
((Rayleigh Scattering))

Figure 19:
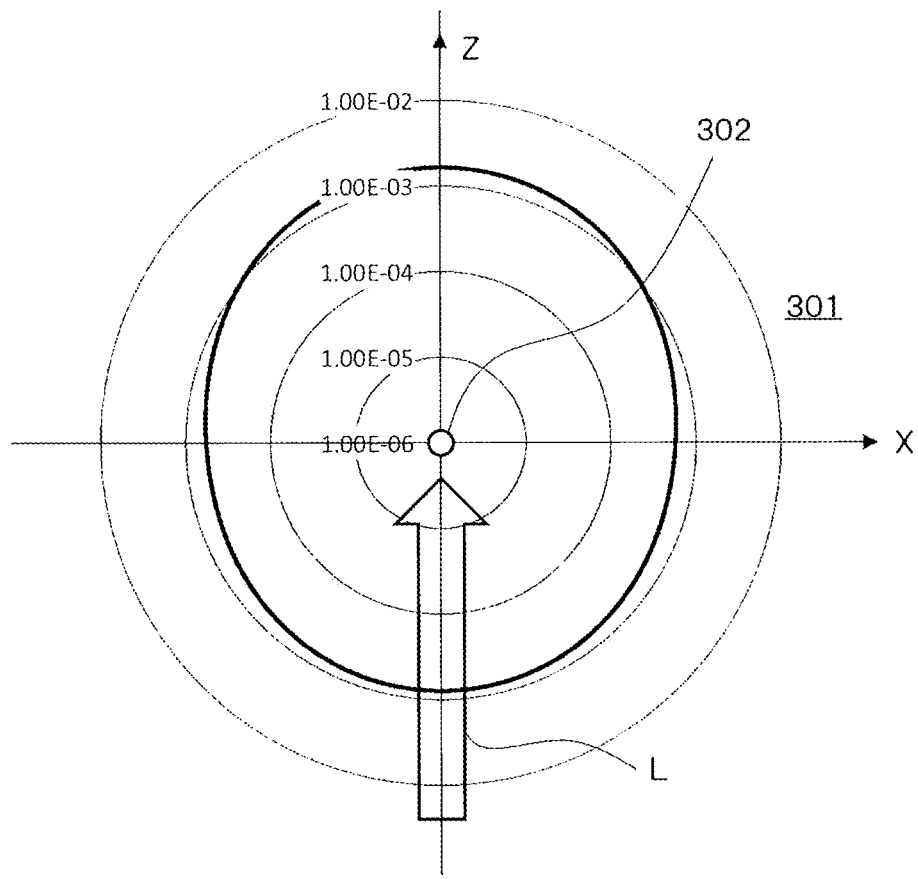
FIG. 19 is a diagram showing an example of scattered light intensity angular distribution of Rayleigh scattering by a single particle according to the first embodiment.

Rayleigh scattering as one of light scattering phenomena will be explained below with reference to FIG. 19. FIG. 19 is a diagram showing an example of scattered light intensity angular distribution of Rayleigh scattering by a single particle 302 according to the first embodiment.

The light colliding with the particle 302 is assumed to be the light Li emitted from the light source, for example. However, the light colliding with the particle 302 can also be the light Lt guided in the diffusive body 20. The vertical axis Z is an axis parallel to the traveling direction of the light Li. The light Li is traveling in a +Z-axis direction. The horizontal axis X is an axis orthogonal to the vertical axis Z.

In case where the particle diameter of the particle is smaller than the wavelength of visible light, Rayleigh scattering occurs when a light beam collides with the particle. The wavelength of visible light is in a range from 380 nm to 780 nm, for example. Specifically, Rayleigh scattering occurs when a size parameter a represented by the particle diameter d of the particle and the wavelength $\lambda$ of light satisfies the following expression (1):

$$\alpha \ll \pi \cdot d / \lambda \quad (1)$$

where "·" represents multiplication.

In Rayleigh scattering, a scattering cross section $\sigma$ is a parameter indicating the probability of occurrence of scattering, and has a relationship of the following expression (2) with the particle diameter d and the wavelength $\lambda$ of light:

$$\sigma \propto d^6 / \lambda^4 \quad (2)$$

According to the expression (2), the scattering cross section $\sigma$ in Rayleigh scattering is inversely proportional to the fourth power of the wavelength $\lambda$ of light. Thus, in Rayleigh scattering, light of a shorter wavelength has a higher probability of being scattered. Accordingly, it is apparent from the expression (2) that blue light is more likely to be scattered compared to red light. The wavelength $\lambda$ of the blue light is 450 nm, for example. The wavelength $\lambda$ of the red light is 650 nm, for example.

FIG. 19 shows the scattered light intensity distribution of unpolarized light. The particle diameter d of the particle 302 is 100 nm. The refractive index n of the particle 302 is 1.43. The refractive index of the base material 301 is 1.33. The wavelength of light is 450 nm.

As shown in FIG. 19, in Rayleigh scattering, the scattered light is radiated in all directions. Therefore, even when light enters the diffusive body 20 through the side face f21, light can be extracted from the front surface f22 or the back surface f23 orthogonal to the side face f21.

((Generation of Scattered Light Simulating Sky))

The principle of generating the scattered light simulating the sky (specifically, blue sky) will be described below with reference to FIG. 7 and FIG. 15 to FIG. 19. As shown in FIGS. 7 and 15 to 18, the light Li emitted from the light source 10 enters the diffusive body 20 through the side face f21 of the diffusive body 20. The light Li that has entered the diffusive body 20 through the side face f21 is guided in the diffusive body 20 as the light Lt while going back and forth between the scattering layer 30 and the transmission layer 40. The entered light Lt is reflected at the front surface f22 and the back surface f23 of the diffusive body 20.

While propagating in the diffusive body 20, part of the light Lt collides with the particle 302 or the like included in the scattering layer 30 (or has its traveling path obstructed by the particle 302 or the like). The light Lt colliding with the particle 302 or the like is scattered in all directions (see FIG. 19).

In the scattered light, light incident upon the front surface f22 at an incidence angle less than or equal to a critical angle is emitted from the front surface f22 as the light Ls. The critical angle is the smallest incidence angle at which the total reflection occurs when light heads from a place where the refractive index is large towards a place where the refractive index is small.

In the scattered light, light incident upon the back surface f23 at an incidence angle less than or equal to a critical angle is emitted from the back surface f23 as the light Ls. The critical angle is the smallest incidence angle at which the total reflection occurs when light heads from a place where the refractive index is large towards a place where the refractive index is small.

In this case, according to the expression (2), light of a shorter wavelength has a higher probability of being scattered in Rayleigh scattering. Accordingly, the correlated color temperature Tcs of the scattered light becomes higher than the correlated color temperature Tci of the incident light. The correlated color temperature Tci is the correlated color temperature of the light Li emitted by the light source 10, for example. The correlated color temperature Tcs is the correlated color temperature of the light Ls, for example.

In case where the light Li has spectral distribution throughout the whole visible light range, light of blue color is scattered preferentially. The light Li is white light, for example. The light source 10 includes a white LED, for example. Therefore, by appropriately designing the light source 10 and the diffusive body 20, the light Ls can be made to have a correlated color temperature representing blue that is close to the color of the actual sky.

Incidentally, since the light amount of the light Ls is dependent on the light amount of the incident light Li, it is possible to reproduce the sky color while securing sufficient brightness as the illumination device by appropriately selecting the light amount of the light source 10 to be used. Further, by appropriately designing the scattering layer 30, the thickness of the diffusive body 20 can be made small. For example, according to the configuration in this embodiment, the thickness of the diffusive body 20 can be made 100 mm or less. Further, the thickness of the diffusive body 20 can also be 20 mm or less, and can also be 10 mm or less, for example. Furthermore, the thickness of the diffusive body 20 can be also 5 mm or less, for example. Moreover, the thickness of the diffusive body 20 can be also 1 mm or less when the size (length in the Y-axis direction) of the light source 10 is small or the light Li is light having a small irradiation range on the incidence surface like light emitted from a laser light source or condensed spot light, for example.

Incidentally, while the description of the above example has been given while dividing a surface into two like the front surface f22 and the back surface f23, in case where the diffusive body 20 is in the rod-like shape and the whole of the main surface (the side face of the rod-like shape) is used as the main light emission surface, the aforementioned front surface f22 may be paraphrased as a "region in the main surface and facing the −y-axis direction" and the aforementioned back surface f23 may be paraphrased as a "region in the main surface and facing the +y-axis direction".

((Color Unevenness Suppression Effect by Two-layer Structure))

Figure 20:
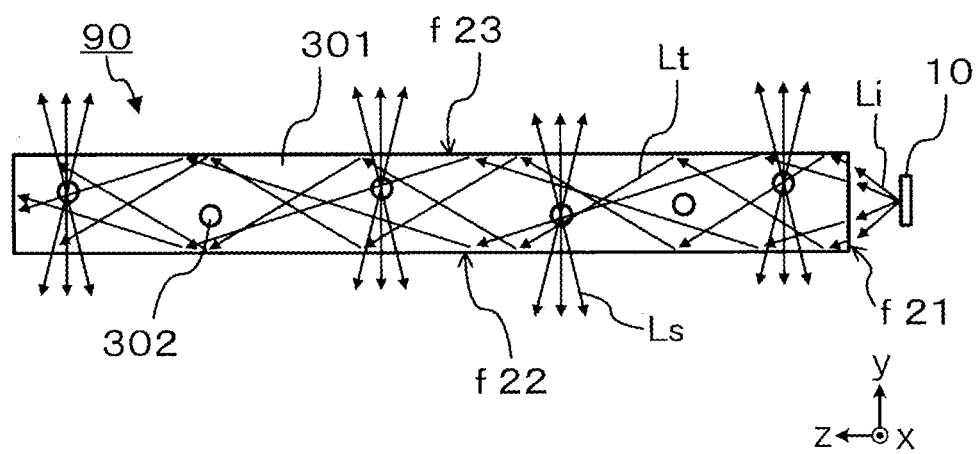
FIG. 20 is a schematic diagram showing an example of a diffusive body having one-layer structure as a comparative example.

FIG. 20 is a schematic diagram showing an example of a diffusive body 90 having one-layer structure as a comparative example. The diffusive body 90 shown in FIG. 20 has a configuration including only the scattering layer 30 in this embodiment. Namely, the diffusive body 90 does not include the transmission layer 40.

In Rayleigh scattering, light of a shorter wavelength has a higher probability of being scattered. Therefore, with the increase in the light guide distance of the light Lt guided in the diffusive body 90, a short wavelength component attenuates further compared to a long wavelength component. Accordingly, the correlated color temperature of the light Ls emitted from a region, in the front surface f22 used as the main light emission surface, near to the incidence surface f21 becomes higher than the correlated color temperature of the light Ls emitted from a region far from the incidence surface f21, for example. This is because the light guide distance of the light Lt is longer and the number of times of being scattered while the light Lt is guided to the region is larger in the far region in comparison with the near region.

Accordingly, it can be understood that with the increase in the light guide distance in the diffusive body 90, the short wavelength component included in the guided light Lt attenuates further and thus wavelength components of the light Lt gradually change towards the long wavelength side. Thus, also in the light Ls deriving from the light Lt, the long wavelength component increases with the increase in the light guide distance. Accordingly, in the diffusive body 90, color unevenness of the light Ls is likely to occur in the main light emission surface.

A distance for which light propagating in a diffusive body propagates without being scattered is defined as the mean free path. The mean free path being short means that the number of times the light guided in the diffusive body is scattered by a particle or the like is large. In other words, the mean free path being short means that the color unevenness of the diffuse light emitted from the diffusive body is relatively high (compared to cases where the mean free path is long). In contrast, the mean free path being long means that the number of times the light guided in the diffusive body is scattered by a particle or the like is small. In other words, the mean free path being long means that the color unevenness of the diffuse light emitted from the diffusive body is relatively low (compared to cases where the mean free path is short).

In contrast with the configuration shown in FIG. 20, the diffusive body 20 in this embodiment is a multilayer structure in which the scattering layer 30 and the transmission layer 40 are optically connected to each other. Therefore, the light Lt after entering the diffusive body 20 through the incidence surface f21 is guided by, for example, repeated total reflection at the main surfaces (the surface f22 and the surface f23 in the drawings) of the diffusive body 20. Further, in that case, the light Lt goes back and forth between the scattering layer 30 and the transmission layer 40 as shown in FIG. 7 and the like. Namely, in the case of the diffusive body 20 in this embodiment, the light Lt after entering the diffusive body 20 through the incidence surface f21 is guided while going back and forth between the scattering layer 30 and the transmission layer 40 and repeatedly undergoing the reflection at the main surface(s) of the diffusive body 20. During the light guiding in such a diffusive body 20, no scattering occurs while the light Lt propagates in the transmission layer 40. In other words, in the total path of the light Lt propagating in the diffusive body 20, paths of the light Lt propagating in the transmission layer 40 are all free paths. Accordingly, the mean free path of the light Li in the diffusive body 20 in this embodiment with respect to the distance from the incidence surface can be made longer than the mean free path in the diffusive body 90 as the comparative example configured without the transmission layer 40 according to the same conditions regarding the size of the diffusive body, the particle concentration, etc. This means that the diffusive body 20 in this embodiment is capable of reducing the color unevenness of the light Ls in the main light emission surface in comparison with the configuration not including the transmission layer 40.

If it is attempted to reduce the color unevenness in the configuration shown in FIG. 20, it is necessary to limit the length of the diffusive body 90 or limit the concentration of the particles 302 to the extent that the color unevenness becomes inconspicuous. Alternatively, it is necessary to make the concentration of the particles 302 included in the base material 301 have a distribution in the traveling direction of the light Lt. Specifically, it is necessary to decrease the particle concentration with the decrease in the distance from the incidence surface and increase the particle concentration with the increase in the distance from the incidence surface. In contrast, with the configuration of the diffusive body 20 in this embodiment, the color unevenness reduction effect can be obtained irrespective of the length of the diffusive body 20 and the scattering power of the scattering layer 30 and without the need of making the particle concentration have a distribution.

As above, the diffusive body 20 according to this embodiment is configured to reduce the color unevenness of the light Ls compared to the configuration not including the transmission layer 40 even in a low-profile configuration in which light enters the diffusive body 20 through an end part of the diffusive body 20 and the light is emitted in a direction orthogonal to the traveling direction of the light.

Further, with the configuration in this embodiment, the thickness of the illumination device 200 including a housing can be made 100 mm or less, for example. The thickness of the illumination device 200 can also be 50 mm or less, and a thickness 30 mm or less is also possible, for example.

Incidentally, a ratio between the scattering layer 30 and the transmission layer 40 in the light guide path of the light Lt and a thickness ratio between the scattering layer 30 and the transmission layer 40 in the diffusive body 20 related to the former ratio are not particularly limited. These ratios are determined properly by considering a desired color unevenness reduction effect, the light amount of the light Lt, etc. in appropriate balance. As an example, when the color unevenness reduction effect is desired to be enhanced, the thickness of the transmission layer 40 may be increased compared to the scattering layer 30. When the light amount of the light Lt is desired to be increased, the thickness of the scattering layer 30 may be increased compared to the transmission layer 40. However, this does not apply to a case where at least part of the light Lt is turned back at the light guide end face and is used again as the light Lt guided in the diffusive body 20.

Furthermore, with the configuration in this embodiment, the adjustment of the refractive index difference between the members forming the interface f50 makes it possible to inhibit the reflection at the interface f50 and prevent loss of opportunity to turn into the light Ls, by which both the thinning and the color unevenness reduction effect can be achieved while securing a sufficient light amount of the light Ls.

Moreover, with the configuration in this embodiment, the diffusive body capable of emitting the light Ls can be manufactured by, for example, performing the coating process of coating with the member forming the scattering layer 30, the film bonding process or the concavity/convexity formation processing on the base material 401 or the like forming the transmission layer 40. Therefore, productivity can be increased in comparison with the configuration including only the scattering layer 30.

((Circadian Effect by Color Change of Light Source))

As already explained earlier, the illumination device 200 can include a plurality of light sources 10 differing in the light emission color.

For example, the illumination device 200 may dynamically change the correlated color temperature (Tci) of the light Li by controlling each light source 10. By this method, the correlated color temperature (Tcs) of the light Ls can be changed dynamically. Further, the illumination device 200 may dynamically change the light amount of the light Li by controlling each light source 10, for example. By this method, the light amount of the light Ls can be changed dynamically.

By changing the correlated color temperature and the light amount of the light Li as the incident light to the diffusive body 20 as above, it is possible to cause an observer viewing the light Ls to feel that the color of the sky is changing with time. Then, generating the circadian rhythm becomes possible.

The "circadian rhythm" is a physiological phenomenon that changes at periods of approximately 24 hours. The circadian rhythm exists in most living things such as animals and plants. The circadian rhythm is generally referred to also as a "biological clock". In a strict sense, the circadian rhythm is formed internally. However, the circadian rhythm is modified by stimulation from the external world such as light, temperature or meals.

((Paraphrasing of Optical Properties))

Features and optical properties of the diffusive body 20 in this embodiment can directly be regarded as features and optical properties of the diffusive body having the scattering power of the one-layer structure (e.g., the aforementioned diffusive body 90) except for parts contributing to the aforementioned effect of extending the mean free path by the multilayer structure.

For example, the thickness of the diffusive body 20 (the thickness of the multilayer structure of the scattering layer 30 and the transmission layer 40) can directly be regarded as the thickness of the diffusive body 90. The same goes for other features (shape examples and peripheral structure). Further, for example, the light guide path of the light Lt in the diffusive body 20 can directly be regarded as the light guide path of the light Lt in the diffusive body 90. The same goes for the optical path length. Furthermore, for example, an average refractive index, an average transmittance and an average haze value (e.g., a value obtained by performing weighted averaging of values of the scattering layer 30 and the transmission layer 40 based on the ratios of the scattering layer 30 and the transmission layer 40 in the light guide path of the light Lt) of the diffusive body 20 can be regarded as the refractive index, the transmittance and the haze value of the diffusive body 90.

In regard to the particle concentration and scattering efficiency of the diffusive body 20, after providing the mean free path extension effect, the particle concentration and the scattering efficiency of the scattering layer 30 may be regarded as the particle concentration and the scattering efficiency of the diffusive body 90.

The same goes for opposite cases. Namely, features and optical properties that the diffusive body 90 can have can be provided also to the diffusive body 20 in this embodiment. In that case, parts other than the parts influencing the aforementioned mean free path extension effect by the multilayer structure may be directly reused without paraphrasing, and the parts influencing the mean free path extension effect may be paraphrased while considering the influence on the effect.

((Other Effects))

Further, the haze value (more specifically, the average haze value) of the diffusive body 20 in the thickness direction is in a range of 0.005% to 30%, for example. By holding down the haze value of the diffusive body 20 within this range when the illumination device 200 is used also as a window, for example, it is possible to let the illumination device 200 have sufficient transparency or light permeability as the window when the light source 10 is not lit up, and to obtain sufficient reproducibility of the sky color while reducing the color unevenness and brightness unevenness of the illumination device when the light source 10 is lit up.

The haze value is an index regarding the transparency and can be obtained from the ratio of diffusively transmitted light to all-rays transmitted light. The haze value in the thickness direction means the ratio between the diffusively transmitted light and the all-rays transmitted light emitted from the front surface f22 (or the back surface f23) when white light enters the diffusive body 20 through the back surface f23 (or the front surface f22).

The illumination device 200 is capable of providing an indoor environment with a sense of openness in clear weather irrespective of the actual weather, such as functioning as a window and taking external light into the indoor environment, for example, by setting the light source 10 in a non-lighting state when the weather is clear, functioning as an illumination device simulating the natural sky by setting the light source 10 in a lighting state when the weather is rainy or cloudy, and so forth.

Incidentally, not only when the weather is rainy or cloudy but also when the sunlight is intense, for example, the illumination device 200 can set the light source 10 in the lighting state and set a back plate 52 (as will be described later with reference to FIG. 21) in a closed state and thereby provide the sense of openness of the natural sky while reducing a feeling of discomfort due to the glare of the sunlight.

Furthermore, with the illumination device 200, it is possible not only to provide the sense of openness of the natural sky irrespective of the weather but also to set the light source in the non-lighting state and let the user view a space on the opposite side via the diffusive body 20 when the user wants to view the space on the opposite side by switching the light source between the lighting state and the non-lighting state according to user operations.

Moreover, by configuring the illumination device 200 so that the diffusive body 20 itself is slidable, it is possible to achieve both the function as the illumination device simulating the natural sky and a function of an openable window.

(First Modification)

A first modification of the illumination device according to the first embodiment will be described below. In the following description, components in common with the illumination device 200 are assigned the same reference characters as in the illumination device 200 and repeated explanation thereof is omitted.

Figure 21:
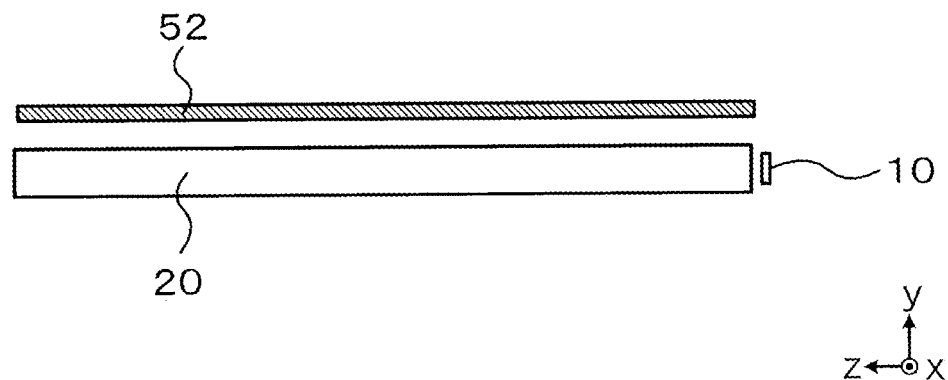
FIG. 21 is a cross-sectional view showing an example of a configuration of an illumination device according to a first modification.

FIG. 21 is a cross-sectional view showing an example of the configuration of an illumination device 210 according to the first modification. The illumination device 210 includes a back plate 52 in addition to the light source 10 and the diffusive body 20.

The back plate 52 is provided on the back surface's side of the diffusive body 20. The back plate 52 may be provided to face the back surface f23 of the diffusive body 20. Incidentally, it is desirable that the distance between the back plate 52 and the diffusive body 20 be short.

The back plate 52 is nontransparent, and its transmittance is preferably 50% or less, and more preferably 10% or less.

The back plate 52 is preferably a diffusive reflector, and more preferably a white diffusive reflector. The back plate 52 can also be a light absorber.

In case where the illumination device 210 is used also as a window, the back plate 52 may be provided so that switching between an open state and a closed state is possible. With the back plate 52 provided to be openable and closable, it is possible to set the back plate 52 in the open state and let the user view the space on the back surface's side via the diffusive body 20 or take in external light when the user wants to view the space on the back surface's side or take in the external light. The back plate 52 may be configured so that the switching between the open state and the closed state is possible by folding the back plate 52 or storing the back plate 52 in a shutter box like blinds or a shutter, for example.

The back plate 52 may be configured so that its screening condition can be changed by voltage applied to the back plate 52 like a liquid crystal shutter, for example. The back plate 52 may be configured so that its screening condition can be changed by voltage applied to the back plate 52 like a liquid crystal panel, for example.

Further, the back plate 52 may be supported integrally with the diffusive body 20 in the frame body 500. In that case, the back plate 52 may be supported to be openable and closable integrally with the diffusive body 20.

((Effect of Back Plate 52))

When the light source 10 is on, the light Ls is emitted not only from the front surface f22 of the diffusive body 20 but also from the back surface f23. For example, at a wall on which the illumination device 210 is installed, in case where the front surface f22 is facing the side where the observer is situated (hereinafter referred to as an inner side) selected from the spaces separated by the wall, the scattered light Ls emitted from the back surface f23 to the back surface f23's side (hereinafter referred to as an outer side) is not viewed by the observer and wasted as a loss. Further, when the illumination device 210 is used as a window, the emission of the scattered light Ls to the outer side can cause light pollution to a person other than the observer and situated on the outer side.

By providing the back plate 52 on the back surface f23's side of the diffusive body 20, the scattered light Ls emitted from the back surface f23 of the diffusive body 20 when the light source 10 is on can be prevented from being emitted to the outer side. Further, by using a member that reflects the scattered light Ls emitted from the back surface f23 like a diffusive reflector, for example, as the back plate 52, the scattered light Ls emitted from the back surface f23 can be emitted from the front surface f22 and the light utilization efficiency of the illumination device 210 as an illumination device can be increased.

As above, by providing the back plate 52 on the back surface's side of the diffusive body 20, an illumination device 210 with increased light utilization efficiency and an illumination device 210 with reduced light leakage to the back surface's side can be realized.

(Second Modification)

A second modification of the illumination device according to the first embodiment will be described below. In the following description, components in common with the illumination device 200 or the illumination device 210 are assigned the same reference characters as in the illumination device 200 or 210 and repeated explanation thereof is omitted.

Figure 22:
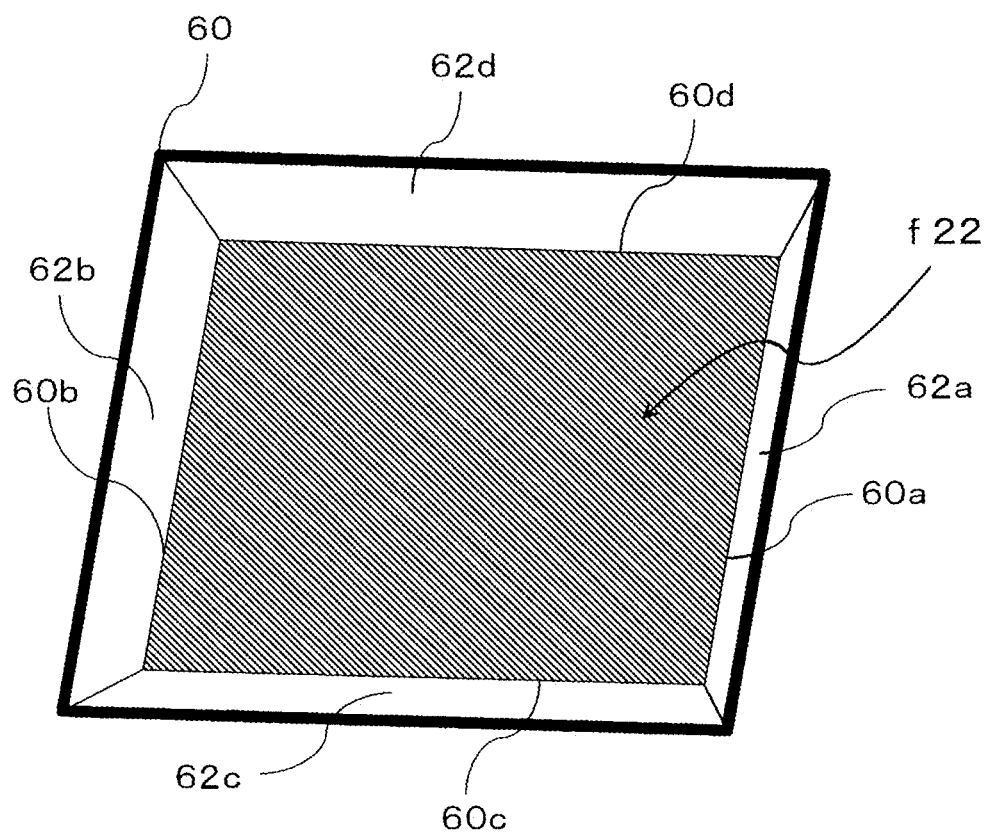
FIG. 22 is a perspective view showing an example of a configuration of an illumination device according to a second modification.
Figure 23:
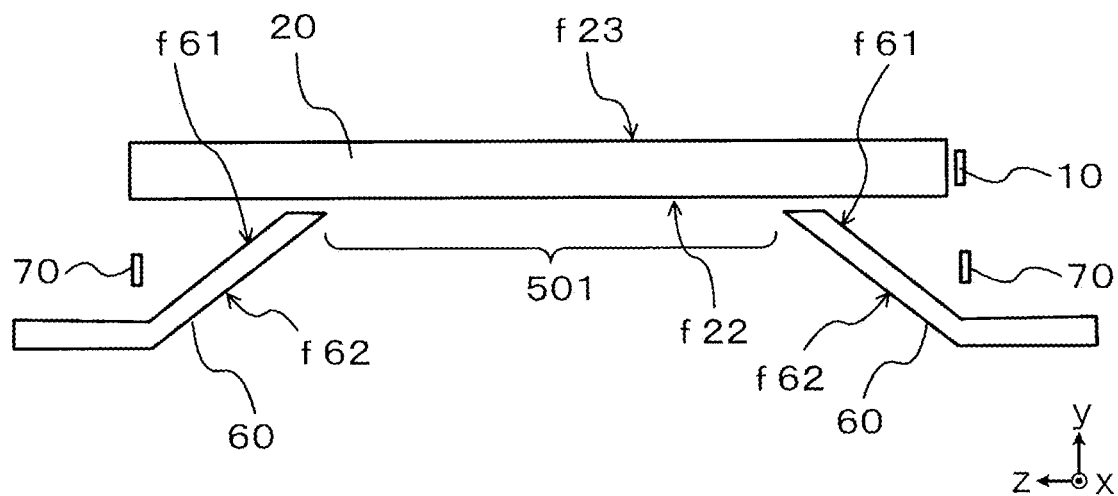
FIG. 23 is a cross-sectional view showing an example of a configuration of the illumination device according to the second modification.

FIG. 22 and FIG. 23 are explanatory diagrams showing an example of the configuration of an illumination device 220 according to the second modification. Specifically, FIG. 22 is a perspective view of the illumination device 220 and FIG. 23 is a cross-sectional view of the illumination device 220.

The illumination device 220 includes a sunlight expression unit 60 and an auxiliary light source 70 in addition to the light source 10 and the diffusive body 20.

The sunlight expression unit 60 is provided on the front surface f22's side of the diffusive body 20. The sunlight expression unit 60 has an incidence surface f61 and an emission surface f62. The incidence surface f61 is a surface on a counter-view side of the sunlight expression unit 60, for example. The emission surface f62 is a surface on a view side of the sunlight expression unit 60, for example. Here, the view side is a side that is viewed by the user situated on the main light emission surface's side of the diffusive body 20 in the state in which the illumination device 220 has been installed, and the counter-view side is a side opposite to the view side.

For example, the sunlight expression unit 60 may be divided into a plurality of areas (in this example, sunlight expression units 60a, 60b, 60c and 60d corresponding to sides of a region 501 as a rectangular window region, for example) for convenience. Incidentally, the dividing of the sunlight expression unit 60 is not limited to this example.

In the case where the sunlight expression unit 60 is divided into a plurality of areas for convenience, for example, the incidence surface f61 and the emission surface f62 may also be divided into a plurality of areas corresponding to the sunlight expression units 60 after the division.

In the example shown in FIG. 23, the sunlight expression unit 60 is divided into four areas and these areas are respectively referred to as sunlight expression units 60a, 60b, 60c and 60d. In that case, the incidence surface f61 and the emission surface f62 may also be divided into four areas. In the following description, the incidence surface of the sunlight expression unit 60a is referred to as f61a and the emission surface of the sunlight expression unit 60a is referred to as f62a. Similarly, the incidence surface of the sunlight expression unit 60b is referred to as f61b and the emission surface of the sunlight expression unit 60b is referred to as f62b, the incidence surface of the sunlight expression unit 60c is referred to as f61c and the emission surface of the sunlight expression unit 60c is referred to as f62c, and the incidence surface of the sunlight expression unit 60d is referred to as f61d and the emission surface of the sunlight expression unit 60d is referred to as f62d.

The auxiliary light source 70 is provided on a back side (the counter-view side as viewed from the user) of the sunlight expression unit 60. Namely, the sunlight expression unit 60 is provided with the auxiliary light source 70 on the incidence surface f61's side. For example, the auxiliary light source 70 may be provided between the sunlight expression unit 60 and the diffusive body 20.

In the case where the sunlight expression unit 60 is divided into a plurality of areas for convenience, the sunlight expression unit 60 is provided with the auxiliary light source 70 on the incidence surface f61's side of at least one area.

The auxiliary light source 70 is an LED light source, for example. While illustration is left out, the auxiliary light source 70 may include a substrate 72 and an LED element 73 similarly to the light source 10. Further, a plurality of auxiliary light sources 70 may be provided. In that case, the auxiliary light sources 70 may be arranged on the substrate 72, for example, similarly to the light sources 10. In that case, the sunlight expression unit 60 may be considered to be provided with a plurality of auxiliary light sources 70.

For example, in the case where the sunlight expression unit 60 is divided into a plurality of areas, the sunlight expression unit 60 may be configured so that at least one auxiliary light source 70 is arranged in each area. It is also possible to arrange two or more auxiliary light sources 70 in each area, for example. As an example, in case where the sunlight expression unit 60 is provided to form a polygonal window region 501, a plurality of auxiliary light sources 70 may be provided along each side of the window region 501.

The correlated color temperature of the light emitted by each light source may be either the same as each other or different from each other.

Further, the color of the light emitted from the auxiliary light source 70 can also be color other than white color. In the case where a plurality of auxiliary light sources 70 are provided, the auxiliary light sources 70 can include a white LED light source and an orange-based LED light source, for example. Furthermore, the auxiliary light sources 70 can include a white LED light source of a low color temperature and a white LED light source of a high color temperature, for example.

The sunlight expression unit 60 is formed with a light diffuser, for example. The light diffuser may be either a member obtained by dispersing fine particles in a transparent member or a member obtained by performing surface treatment such as emboss processing on the surface of a transparent member.

The sunlight expression unit 60 may be formed with a transparent member and a light diffuser, for example. In this case, the light diffuser may be provided on the incidence surface's side of the transparent member, on the emission surface's side of the transparent member, or on both sides of the transparent member. The light diffuser can be either a thin-film coating formed with a transparent base material and fine particles or a diffusive sheet formed with a transparent base material and fine particles, for example. The sunlight expression unit 60 may be formed by applying or stacking such a light diffuser on the surface of the transparent member.

The light emitted from the auxiliary light source 70 enters the sunlight expression unit 60 through the incidence surface f61 of the sunlight expression unit 60 and exits from the emission surface f62 as diffuse light. This enables the emission surface f62 of the sunlight expression unit 60 to emit light.

The sunlight expression unit 60 may either make the whole of the emission surface f62 emit light or make only a region as a part of the emission surface f62 emit light. In the case where the sunlight expression unit 60 is divided into a plurality of areas, the sunlight expression unit 60 may carry out the light emission area by area. For example, the sunlight expression unit 60 may either make all the areas emit light or set some of the areas in a non-emission state. For example, the sunlight expression unit 60 may set a part of the sunlight expression unit 60 in the non-emission state by controlling the lighting of a plurality of light sources provided as the auxiliary light source 70. The sunlight expression unit 60 may also make only a region as a part of one area emit light.

Incidentally, the illumination device 220 may further include the back plate 52 similarly to the illumination device 200 and the illumination device 210.

((Effect of Sunlight Expression Unit 60))

By providing the sunlight expression unit 60 capable of emitting light on the emission side of the main light emission surface of the diffusive body 20, the observer is made to have an illusion as if the sun existed on the back surface's side of the diffusive body 20 and the window frame were illuminated with the sunlight. This increases naturalness felt by the observer when the illumination device 220 functions as an illuminator, and increases the sense of openness of the space. Further, by setting a part of the sunlight expression unit 60 that should not be illuminated with the sunlight in the non-emission state like an actual window, the naturalness felt by the observer when the illumination device 220 functions as an illuminator increases further.

(Third Modification)

A third modification of the illumination device according to the first embodiment will be described below. In the following description, components in common with the illumination device 200, the illumination device 210 or the illumination device 220 are assigned the same reference characters as in the illumination device 200, 210 or 220 and repeated explanation thereof is omitted.

Figure 24:
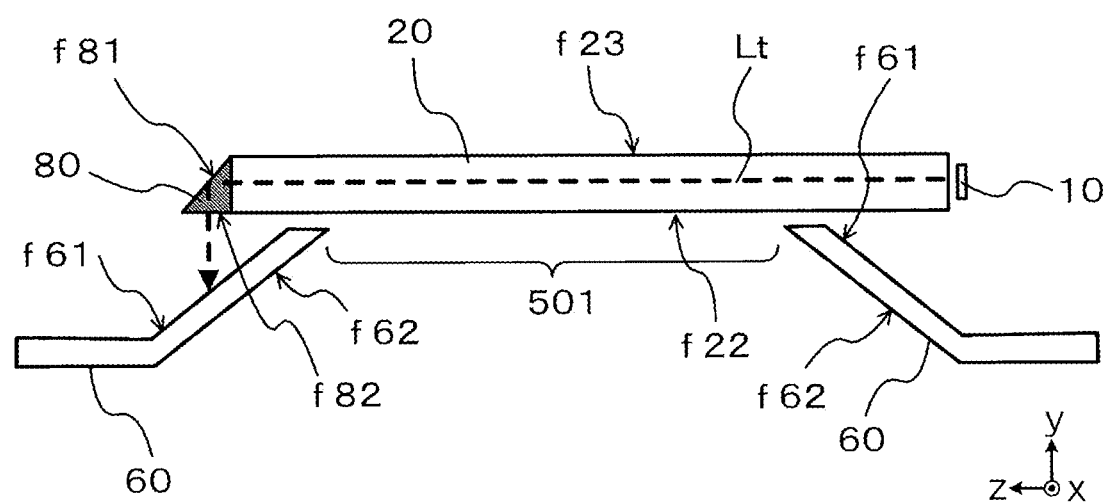
FIG. 24 is a cross-sectional view showing an example of a configuration of an illumination device according to a third modification.
Figure 25:
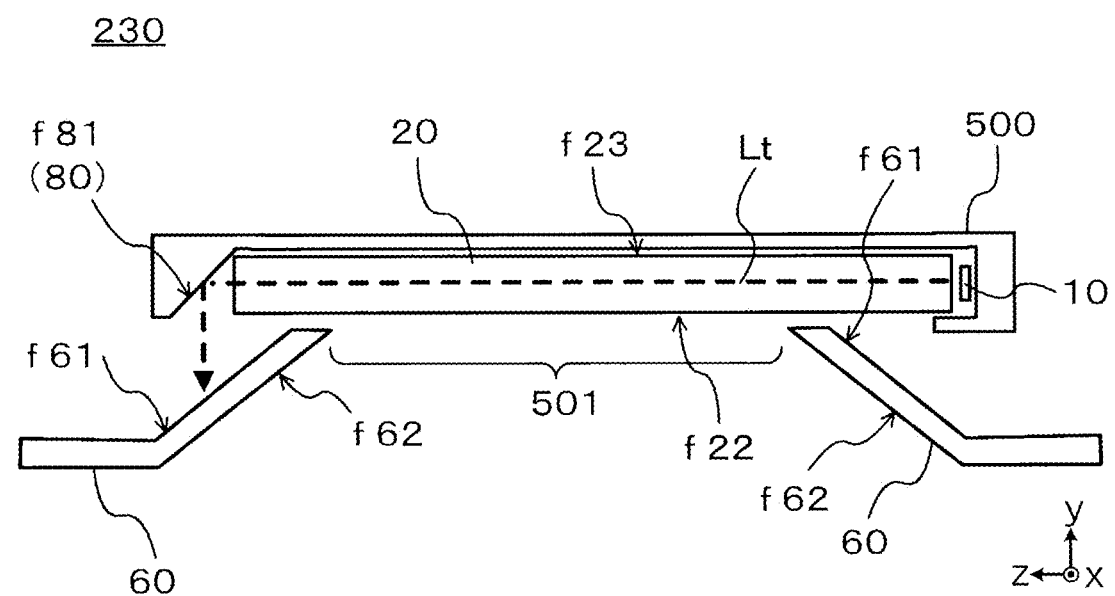
FIG. 25 is a cross-sectional view showing an example of a configuration of the illumination device according to the third modification.
Figure 26A:
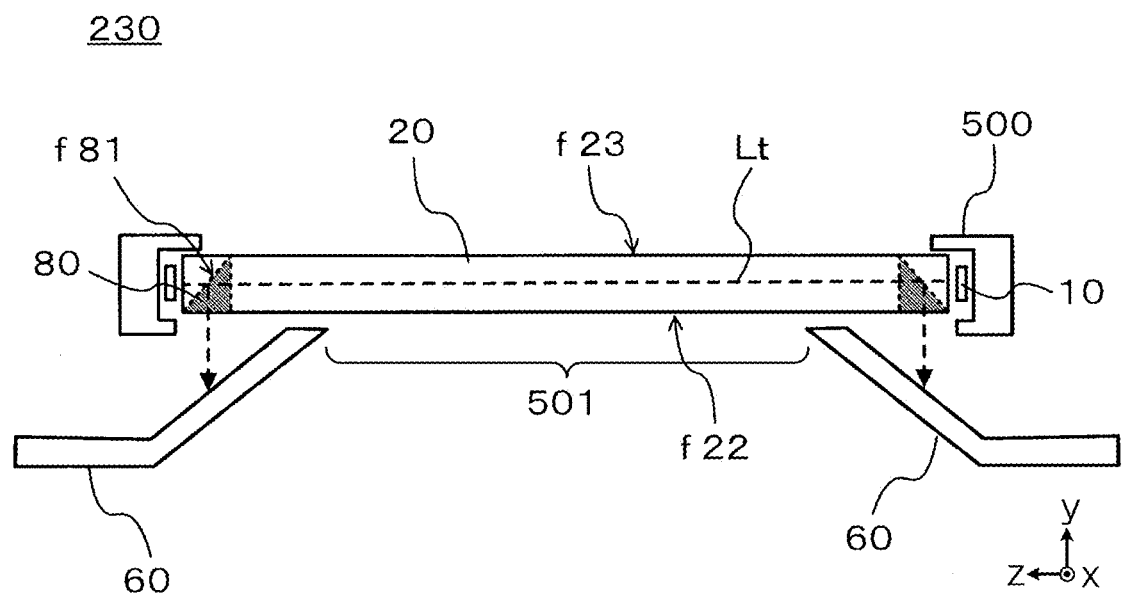
FIGS. 26A and 26B are cross-sectional views showing configuration examples of the illumination device according to the third modification.
Figure 26B:
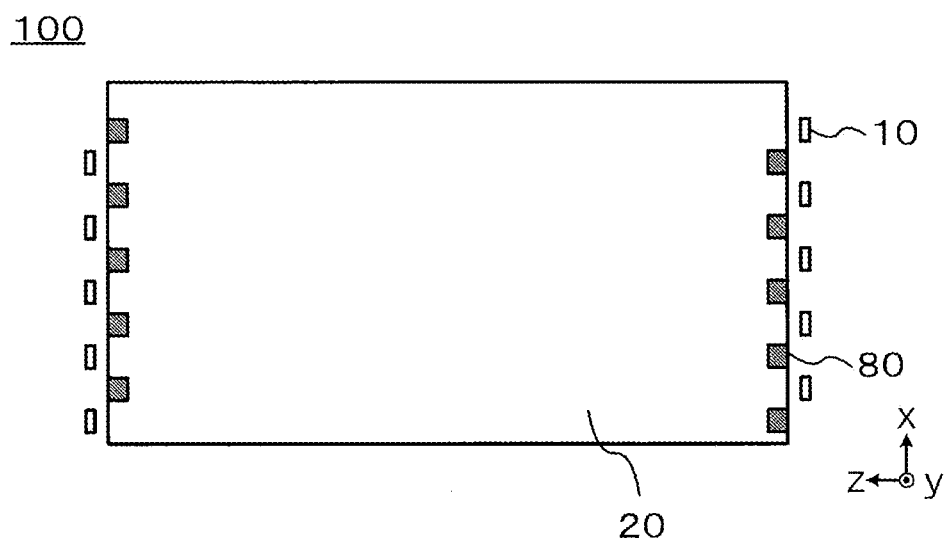
Figure 27:
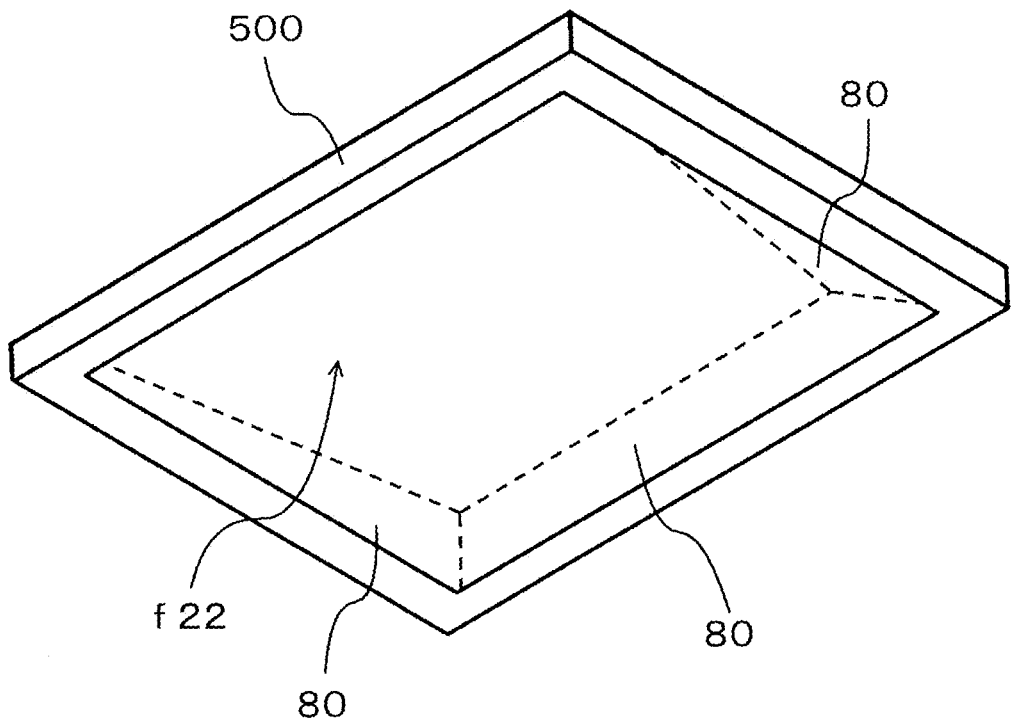
FIG. 27 is a perspective view showing an example of a configuration of the illumination device according to the third modification.

FIG. 24 to FIG. 27 are explanatory diagrams showing examples of an illumination device 230 according to the third modification. Specifically, FIG. 24 to FIG. 26 are cross-sectional views showing examples of the illumination device 230, and FIG. 27 is a perspective view showing an example of the illumination device 230.

The illumination device 230 includes a light turnback unit 80 in addition to the light source 10, the diffusive body 20 and the sunlight expression unit 60.

The light turnback unit 80 is provided on the side face f21 of the diffusive body 20. The light turnback unit 80 is provided on at least one side face f21 of the diffusive body 20. The light turnback unit 80 emits the light Lt, arriving at the light turnback unit 80 after being guided in the diffusive body 20, towards the sunlight expression unit 60. The light turnback unit 80 changes the traveling direction of the light Lt. Incidentally, the light turnback unit 80 is an example of a deflection unit 80. While a broken line arrow parallel to the Z-axis direction is shown in FIG. 24 to FIG. 26 as an arrow indicating the traveling direction of the light Lt, the state of the light guiding of the light Lt is similar to that in the above-described embodiment. Namely, also in this example, the light Lt being guided in the diffusive body 20 goes back and forth between the scattering layer 30 and the transmission layer 40.

The light turnback unit 80 may have a reflecting surface f81. In that case, the light turnback unit 80 reflects light arriving at the light turnback unit 80 with the reflecting surface f81 towards the sunlight expression unit 60. Incidentally, the specific mode of the light turnback unit 80 is not limited to the example shown in FIG. 24 as long as the light turnback unit 80 has a traveling direction changing function capable of emitting light arriving at the end face on the side opposite to the incidence surface towards the sunlight expression unit 60.

The light whose traveling direction have changed by the light turnback unit 80 illuminates the incidence surface f61 of the sunlight expression unit 60. This light enters the sunlight expression unit 60 through the incidence surface f61, is emitted from the emission surface f62, and serves as diffuse light simulating the sunlight.

The reflecting surface f81 is a mirror surface, for example. The reflecting surface f81 is a diffusive reflecting surface, for example. The reflecting surface f81 is provided by means of metal vapor deposition, for example. The reflecting surface f81 is provided by means of white painting, for example.

The light turnback unit 80 may be formed by, for example, cutting away a part of the side face f21 of the diffusive body 20. In this case, the cut surface becomes the reflecting surface f81. Then, an end part of the diffusive body 20 including the cut surface is used as the light turnback unit 80. As above, the diffusive body 20 may include the light turnback unit 80.

Incidentally, the light turnback unit 80 may be provided either integrally with the diffusive body 20 or separately from the diffusive body 20.

The illumination device 230 may further include the auxiliary light source 70 provided on the incidence surface f61's side of the sunlight expression unit 60. The auxiliary light source 70 increases the light amount of the light emitted from the sunlight expression unit 60.

The illumination device 230 and the aforementioned other illumination device may include the light source 10 at each of two or more end faces. In this case, the illumination device may include the light source 10 at each of end faces facing each other, for example. In such cases, as shown in FIG. 27, for example, in the end parts of the diffusive body 20 opposing each other in the illumination device 230, incidence surfaces of the diffusive body 20 and light turnback units 80 (reflecting surfaces f81) may be arranged to be alternate on the same end face and to be staggered between the end faces opposing each other.

In addition, while the incidence surfaces of the diffusive body 20 and the light turnback units 80 (reflecting surfaces f81) are both arranged tightly along each end face, the incidence surfaces and the light turnback units 80 in that case may also be arranged at positions different from each other in the thickness direction of the diffusive body 20. In that case, each light source 10 arranged on one end face may make the light Li enter the diffusive body 20 so that the light Lt is guided from the incidence surface arranged on the end face to the light turnback unit 80 on the opposite end face.

While illustration is left out, it is also possible to stack two or more illumination units 100 so that the illumination units 100 differ from each other in the traveling direction of the light Li. With this configuration, the light source 10 can be arranged in two or more desired directions with respect to the center of the diffusive body 20. In this case, a plurality of light sources 10 may be provided corresponding to the areas each provided with the sunlight expression unit 60.

((Effect of Light Turnback Unit 80))

By making the sunlight expression unit 60 emit the light reflected by the light turnback unit 80, light guided in the diffusive body 20 to be emitted from the side face f21 and wasted as a loss can be utilized, which leads to an increase in the light utilization efficiency.

Further, in case where the increase in the thickness of the illumination device 230 due to the provision of the sunlight expression unit 60 is not permissible, for example, the light turnback unit 80 may be configured to serve also as the sunlight expression unit 60. For example, by providing each of the side faces f21a, f21c and f21d of the diffusive body 20 with the light turnback unit 80, the light turnback unit 80 can serve also as the sunlight expression unit 60. FIG. 27 is a perspective view showing an example of such an illumination device 230 in which side faces of the diffusive body 20 are provided with the light turnback unit 80 (at least the reflecting surface f81) serving also as the sunlight expression unit 60.

In the case where the light turnback unit 80 serves also as the sunlight expression unit 60, the light turnback unit 80 may have a light scattering function in addition to the deflection function. The light scattering function may be implemented by performing surface treatment such as emboss processing on the reflecting surface f81. The light scattering function may also be implemented by, for example, attaching a film having diffusive reflectiveness, for example, on the reflecting surface f81 or performing white painting on the reflecting surface f81. The light scattering function can also be implemented by making the space between the reflecting surface f81 and the emission surface contain particles, for example. The particles can be the particles 302 of the diffusive body 20. In that case, it is possible to describe that the diffusive body 20 serves also as the light turnback unit 80 and the sunlight expression unit 60. It is also possible to describe that the diffusive body 20 includes the light turnback unit 80 and the sunlight expression unit 60 as components.

Further, in the light turnback unit 80, the emission surface that emits the light turned back (which corresponds to the end part of the front surface f22 of the diffusive body 20 in case where the light turnback unit 80 is formed integrally with the diffusive body 20, such a region emitting the light turned back will hereinafter be referred to as an emission surface f82) may be provided with the light scattering function. The light scattering function may be implemented by performing surface treatment such as emboss processing on the emission surface f82, providing the emission surface f82 with a light diffusive coating, or attaching a light diffusive film on the emission surface f82.

Incidentally, while the example shown in FIG. 27 is an example of providing three side faces with the light turnback unit 80, it is also possible to provide every end face with the light turnback unit 80 by implementing the reflecting surface f81 by a half mirror or the like.

Second Embodiment

Figure 28:
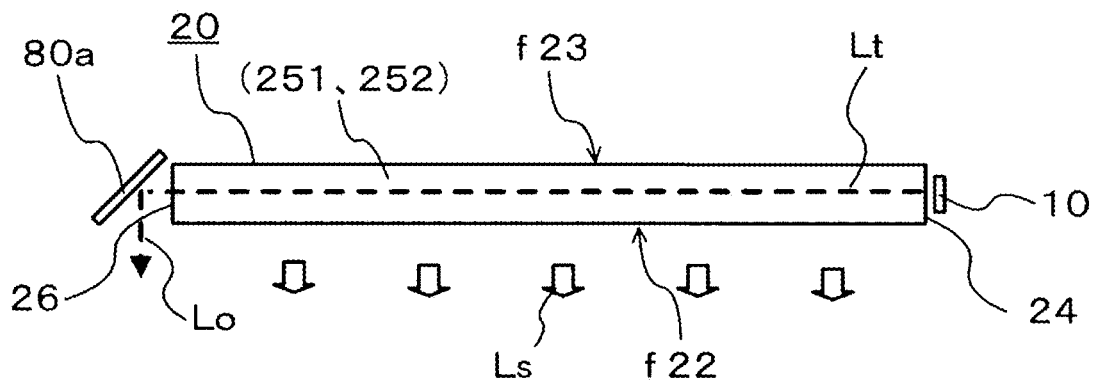
FIG. 28 is a cross-sectional view showing a schematic configuration of an illumination device according to a second embodiment.

FIG. 28 is an explanatory diagram showing an example of the configuration of an illumination device 240 according to a second embodiment. The illumination device 240 includes the light source 10, the diffusive body 20 and a light extraction unit 80a. In the following description, components in common with the illumination device 200, the illumination device 210, the illumination device 220 or the illumination device 230 are assigned the same reference characters as in the illumination device 200, 210, 220 or 230 and repeated explanation thereof is omitted.

In the illumination device 240, the diffusive body 20 includes a light incidence surface 24 as a light incidence unit, a light guide diffusion part 251, a light guide part 252, the front surface f22 and the back surface f23 as scattered light emission parts (first light emission surfaces), and a second light emission surface 26 as a propagating light emission part. In this example, in the diffusive body 20, a part that includes a medium and an optical medium on the nanometer order such as light scattering particles (hereinafter referred to simply as particles 302) and generates scattered light by guiding the incident light and having the light scattered by the particles 302 is referred to as the light guide diffusion part 251. Further, in the diffusive body 20, a part that does not include the particles 302 and guides the incident light without scattering the light is referred to as the light guide part 252. The light guide diffusion part corresponds to the scattering layer 30 in the above embodiment, and the light guide part corresponds to the transmission layer 40 in the above embodiment.

The light emitted from the light emission surface f11 of the light source 10 is incident upon the light incidence surface 24. The light guide diffusion part 251 includes the base material 301 as the medium and the particles 302 existing in the base material 301. The light guide diffusion part 251 generates the light Ls by guiding the incident light and having the light scattered by the particles 302. The diffusive body 20 has the light incidence surface 24 in an end part and the second light emission surface 26 in an end part opposite to the light incidence surface 24, for example. The light source 10 is arranged in an end part of the diffusive body 20, and the light Li emitted from the light emission surface f11 of the light source 10 enters the inside of the diffusive body 20 including the light guide diffusion part 25 through the light incidence surface 24.

The light Li entering the diffusive body 20 is guided inside the diffusive body 20 as the light Lt and thereafter emitted from the second light emission surface 26. Alternatively, the light Li entering the diffusive body 20 is scattered by the particles 302 included in the light guide diffusion part 251 of the diffusive body 20 while being guided inside the diffusive body 20 as the light Lt, thereby turns into the light Ls, and is emitted from the front surface f22 or the like as the first light emission surface. Alternatively, the light Li entering the diffusive body 20 is guided inside the diffusive body 20 as the light Lt and thereafter emitted from the second light emission surface 26. In the following description, the light Lt emitted from the second light emission surface 26 can be referred to as light Lo. The correlated color temperature of the light (light Lo) emitted from the second light emission surface 26 is lower than the correlated color temperature of the light (light Ls) emitted from the front surface f22. While the broken line arrow parallel to the Z-axis direction is shown also in FIG. 28 as the arrow indicating the traveling direction of the light Lt, the state of the light guiding of the light Lt is similar to that in the above-described embodiment. Namely, also in this example, the light Lt being guided in the diffusive body 20 goes back and forth between the light guide diffusion part 251 and the light guide part 252.

Here, at least part of the light Lo emitted from the second light emission surface 26 is emitted by the light extraction unit 80a provided in the vicinity of the second light emission surface 26 in the same direction as the light Ls (in the example of FIG. 28, a direction orthogonal to the light guide direction and heading towards the side of the space facing the front surface f22 as the main light emission surface). The light extraction unit 80a has a function of directing the light Lo emitted from the second light emission surface 26 in a particular direction. In the example of FIG. 28, the particular direction is a direction (−Y direction) orthogonal to the light guide direction and heading towards the space facing the front surface f22, e.g., a direction heading towards the view side. Incidentally, the particular direction can also be, for example, a direction (+Y direction) orthogonal to the light guide direction and heading towards the space facing the back surface f23 (the counter-view side).

Further, in the light extraction unit 80a, a lens, a mirror, a film, a surface coating or the like may be formed, for example, in order to control refraction, reflection, diffusion, transmission, etc. of the emitted light (i.e., the light Lo emitted from the second light emission surface 26 after being guided inside the light guide diffusion part 251).

As a concrete example, in case where the light Lo emitted from the second light emission surface 26 is scattered light having broadening in an angular direction and this light is desired to be deflected towards a particular direction and used as light illuminating a space existing in the particular direction (e.g., view side space), it is possible to form the light extraction unit 80a as a mirror and make a reflecting surface of the mirror have a curvature. With such a configuration, the light reflected at the light extraction unit 80a can be controlled to be substantially parallel light and made to travel in the particular direction as the direction heading towards the front surface f22's side.

Further, in order to implement a configuration in which a human situated on the front surface f22's side and viewing the light extraction unit 80a is not dazzled, it is desirable to provide the light extraction unit 80a with a diffusion function, for example. In this case, the light diffused at the light extraction unit 80a can be extracted to the front surface f22's side while suppressing the dazzle felt by the human.

Incidentally, the light extraction unit 80a may be provided either as a modification of the aforementioned light turnback unit 80 or separately from the aforementioned light turnback unit 80.

Third Embodiment

Figure 29:
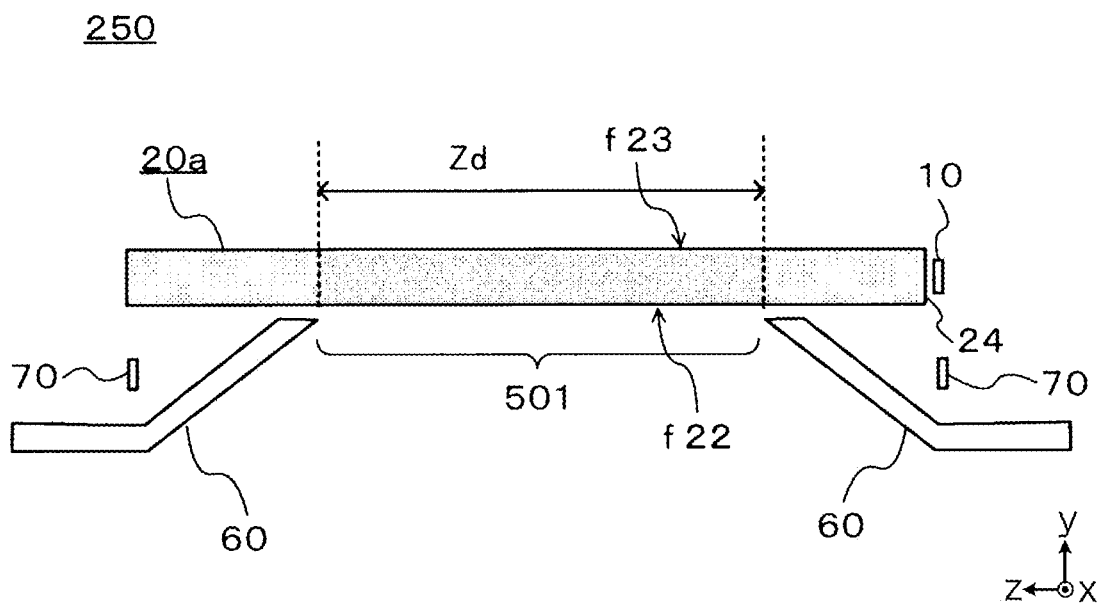
FIG. 29 is a cross-sectional view showing a schematic configuration of an illumination device according to a third embodiment.

FIG. 29 is a cross-sectional view schematically showing the configuration of an illumination device 250 according to a third embodiment. The following description will be given of an example in which a diffusive body 20a has a distribution in surface concentration of the particles 302 included in the diffusive body 20a (the number of particles 302 per unit area of the main light emission surface [pieces/mm$^2$], which corresponds to a number obtained by adding up numbers, each being the number of particles 302 in the diffusive body 20a at each position of the main light emission surface, in the thickness direction).

As shown in FIG. 29, the illumination device 250 includes the light source 10, the diffusive body 20a, and the sunlight expression unit 60 forming the region 501. In the following description, components in common with the illumination device 200, the illumination device 210, the illumination device 220, the illumination device 230 or the illumination device 240 are assigned the same reference characters as in the illumination device 200, 210, 220, 230 or 240 and repeated explanation thereof is omitted.

Figure 30A:
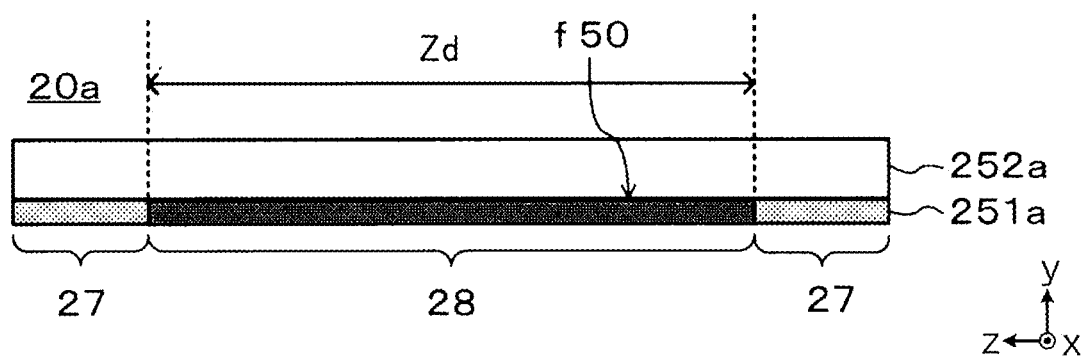
FIGS. 30A and 30B are cross-sectional views showing configuration examples of a diffusive body according to the third embodiment.
Figure 30B:
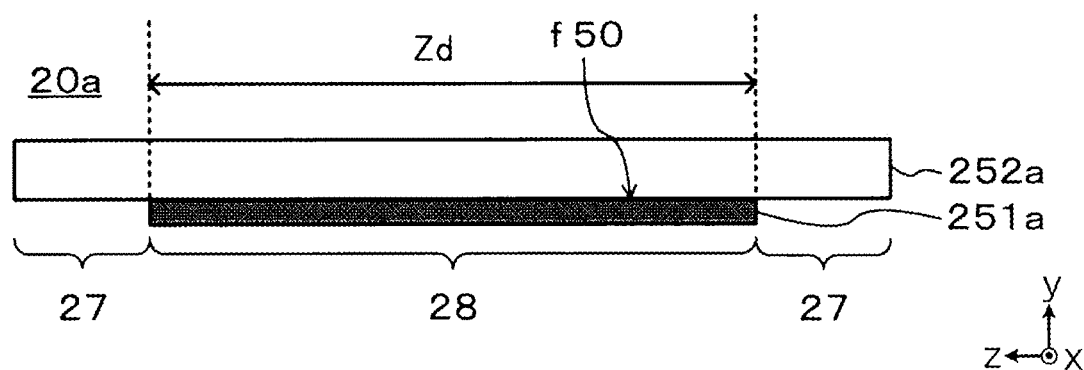

The illumination device 250 employs an edge incidence system in which the light source 10 is arranged to face the light incidence surface 24 as a side face situated in an end part of the diffusive body 20a. FIGS. 30A and 30B are cross-sectional views showing configuration examples of the diffusive body 20a according to this embodiment. As shown in FIGS. 30A and 30B, the diffusive body 20a includes the light incidence surface 24, a light guide diffusion part 251a, a light guide part 252a, and the front surface f22 and the back surface f23 as the first light emission surfaces. In this example, the light guide diffusion part 251a and the light guide part 252a are stacked in the Y-axis direction.

The light emitted from the light emission surface f11 of the light source 10 is incident upon the light incidence surface 24. The light guide diffusion part 251a includes a base material 301 as the medium and a plurality of particles 302 existing in the base material 301. The light guide diffusion part 251a generates the light Ls by guiding the incident light and having the light scattered by the particles 302. The light Ls is emitted through the opening 501. The light guide part 252a forms an interface f50 with the light guide diffusion part 251a in the diffusive body 20a. The light entering the diffusive body 20a and being guided in the diffusive body 20a goes back and forth between the light guide diffusion part 251a and the light guide part 252a via the interface f50.

The diffusive body 20a may include a region 27 where the surface concentration of the particles 302 is low (see FIG. 30A) in the vicinity of at least one side face. In case where the area of the front surface f22 of the diffusive body 20a is larger than the area of the opening 501 provided on the illumination device 250 as shown in FIG. 29, it is possible to inhibit the light emission by the region 27 and increase the light utilization efficiency of the entire illumination device 250 by setting the surface concentration of the particles 302 in the region 27 not visible through the opening 501 to be lower than the surface concentration of the particles 302 in the region 28 visible through the opening 501. Namely, since the scattering probability in the light guide diffusion part 251a existing in the region 27 not visible through the opening 501 can be held down, the light utilization efficiency increases in the purpose of extracting desirable blue color as the illuminating light from the incident light or in the purpose of extracting the propagating light at the end part opposite to the incidence surface or the like as the illuminating light or the light simulating the sunlight.

The region 27 may also be a region not including the light guide diffusion part 251a (see FIG. 30B). For example, the region 27 not viewed through the opening 501 may be configured to include the light guide part 252a alone. Also with such a configuration, the light emission in the region 27 can be inhibited and the light utilization efficiency of the entire illumination device 250 can be increased.

Since the region 27 not visible through the opening 501 is not used for the purpose of emitting the scattered light Ls simulating blue sky, a length Zd of the diffusive body 20a excluding such regions 27 in the light guide direction (Z direction) may be regarded as a substantial length of the light guide diffusion part 251a. Further, as already explained earlier, in the case where the region 27 is a region not including the particles 302, the light incidence surface 24 does not necessarily have to be provided in an end part of the light guide diffusion part 251. Namely, the diffusive body 20a may have a configuration different from the configuration shown in FIG. 29 as long as the diffusive body 20a is configured so that light enters the light guide diffusion part 251a via the region 27. Incidentally, in terms of the ability to precisely control the intensity and the direction of the guided light, it is preferable that the region 27 not including the particles 302 be provided in an end part other than the end part provided with the light incidence surface 24. Assuming that the end part provided with the light incidence surface 24 is a first end part, for example, it is preferable that the region 27 be provided in a second end part of the diffusive body 20a different from the first end part. For example, in case where the light incidence surface 24 is provided on the side face f21a shown in FIG. 5, the diffusive body 20a may be provided with the region 27 in an end part on the side face f21b's side, an end part on the side face f21c's side and an end part on the side face f21d's side. For example, in case where the light incidence surface 24 is provided on the side face f21a and the side face f21b shown in FIG. 5, the diffusive body 20a may be provided with the region 27 in the end part on the side face f21c's side and the end part on the side face f21d's side.

Incidentally, even when there is a region in the diffusive body 20a not visible through the opening 501, it is also possible to form such a region not as the aforementioned region 27 but as a region in which the surface concentration of the particles 302 is approximately the same as or higher than that in other regions when there is a purpose other than the purpose of emitting light simulating blue sky, such as a purpose of supplying the scattered light to the sunlight expression unit 60 or the light turnback unit 80 as described earlier. In other words, in this embodiment, irrespective of whether a region is visible through the opening 501 or not, the surface concentration of the particles 302 in a region that is desired to inhibit or prevent the generation of the scattered light can be set lower compared to other regions. Incidentally, the surface concentration [pieces/mm$^2$] of the particles 302 in a certain region of the main surface can be paraphrased as concentration [pieces/mm$^3$] of the particles 302 in the light guide diffusion part 251a existing in the region.

Incidentally, terms indicating a positional relationship between components or members or a shape, such as "parallel" or "orthogonal", may have been used in the above embodiments. These terms are intended to include a range allowing for tolerances in the manufacture, variations in the assembly, or the like. Therefore, when a description indicating such a positional relationship or shape is included in the claims, such a description is intended to include a range allowing for tolerances in the manufacture, variations in the assembly, or the like.

Further, while the embodiments of the diffusive body, the illumination unit and the illumination device according to the present disclosure have been described as above, the diffusive body, the illumination unit and the illumination device according to the present disclosure are not limited to these embodiments.

DESCRIPTION OF REFERENCE CHARACTERS

100: illumination unit
200, 210, 220, 230, 240, 250: illumination device
10: light source
12: substrate
13: LED element (light-emitting element)
14: lens
20, 20a: diffusive body
f21: side face (end face)
f22: front surface (first surface)
f23: back surface (second surface)
f50: interface
211: notch part
24: light incidence surface
251, 251a: light guide diffusion part
252, 252a: light guide part
26: second light emission surface
27, 28: region
30: scattering layer
301: base material
302: particle
40: transmission layer
401: base material
500: frame body
501: region (window region)
502: region
52: back plate 60: sunlight expression unit
70: auxiliary light source
72: substrate
73: LED element (light-emitting element)
80: light turnback unit (deflection unit)
80a: light extraction unit
f81: reflecting surface

What is claimed is:

1. A diffusive body that lets first light enter and emits scattered light, the diffusive body comprising:
   a scattering layer that exerts predetermined scattering power on the first light and a transmission layer that receives the first light and passes the first light through to the scattering layer, the scattering layer and the transmission layer being stacked together;
   a light incidence surface that lets the first light enter; and
   a main surface where a first light emission surface emitting the scattered light is, wherein
   the light incidence surface is at an end face forming a first end part of the main surface,
   the diffusive body functions as a light guide path that makes the entered first light move to and from between the scattering layer and the transmission layer,
   the scattering layer includes an optical medium on a nanometer order and generates the scattered light by having the entered first light scattered by the optical medium on the nanometer order,
   a second correlated color temperature of the scattered light is higher than a first correlated color temperature of the first light,
   the first light incident on the light incidence surface is guided as guided light in the diffusive body while going back and forth between the scattering layer and the transmission layer,
   part of the guided light that has entered the scattering layer is emitted as the scattered light from the first light emission surface, and
   another part of the guided light that has entered the scattering layer enters the transmission layer again.

2. The diffusive body according to claim 1, wherein the transmission layer and the scattering layer are stacked in an axial direction parallel to a normal direction of the first light emission surface.

3. The diffusive body according to claim 1, wherein a refractive index difference between members forming an interface existing between the scattering layer and the transmission layer at a D line is 0.5 or less.

4. The diffusive body according to claim 1, wherein a condition 0.89≤R≤1.37 is satisfied, where
   out of members forming an interface existing between the scattering layer and the transmission layer, a first member is defined as a member on an incidence side of the interface where principal light included in the first light arrives first and a second member is defined as a member on an exit side of the interface,
   a refractive index of the first member at a D line is n1,
   the refractive index of the second member at the D line is n2, and $R=n2/n1.$ 5. The diffusive body according to claim 1, wherein the optical medium on the nanometer order is nanoparticles or composites having size on the nanometer order, cavities having size on the nanometer order, or surface concave parts or surface convex parts having size on the nanometer order.

6. The diffusive body according to claim 1, wherein a surface of a base material forming the transmission layer is coated with a coating forming the scattering layer.

7. The diffusive body according to claim 1, further comprising two or more regions differing in surface concentration of the optical medium on the nanometer order at the main surface.

8. An illumination device comprising:
   the diffusive body according to claim 1; and
   a light source that emits the first light.

9. The illumination device according to claim 8, further comprising a back plate as a nontransparent structure on a side opposite to the first light emission surface of the diffusive body in regard to an emission direction as a direction in which the scattered light is emitted.

10. The illumination device according to claim 8, further comprising a sunlight expressor having a light emission surface that reproduces sunlight, on a side of the first light emission surface of the diffusive body in an emission direction as a direction in which the scattered light is emitted.

11. The illumination device according to claim 8, wherein the diffusive body has a second light emission surface that opposes the light incidence surface and emits the light guided in the diffusive body, and the illumination device further comprises a light extractor that deflects the light emitted from the second light emission surface to make the light head for a space facing the first light emission surface.

12. The diffusive body according to claim 7, further comprising a region where the surface concentration of the optical medium on the nanometer order is low in the vicinity of at least one side face of the diffusive body.

13. The diffusive body according to claim 1, further comprising at least two light incidence surfaces including the light incidence surface.

14. The diffusive body according to claim 1, further comprising a second light emission surface emitting the first light guided in the diffusive body, wherein
   the second light emission surface is provided on a position facing the light incidence surface or an end part of the diffusive body facing the first end part, and
   a third correlated color temperature of the first light emitted from the second light emission surface is lower than the second correlated color temperature of the scattered light.

15. The diffusive body according to claim 1, further comprising a second emission surface provided on a position facing the light incidence surface or an end part of the diffusive body facing the first end part, wherein
   a shape of the diffusive body is in the form of a plate,
   the first light emission surface is formed on a first surface of the diffuse body in the form of the plate,
   the light incidence surface is formed on a side surface of the diffuse body in the form of the plate,
   a light emitted from the first emission surface includes at least the scattered light,
   a light emitted from the second emission surface includes the scattered light and the first light that has guided in the diffusive body, and
   a first light intensity of the light emitted from the first light emission surface is lower than a second light intensity of the light emitted from the second light emission surface.

16. The illumination device according to claim 10, wherein the sunlight expression expressor is divided into a plurality of areas.

17. The illumination device according to claim 10, further comprising an auxiliary light source, a light emitted by the auxiliary light source being emitted through the light emission surface.

18. The illumination device according to claim 10, wherein the sunlight expressor has a light diffuser.

19. The illumination device according to claim 11, wherein the light extractor has at least one of a lens, a minor, a film, and a surface coating in order to control at least one of refraction, reflection, diffusion, and transmission of the light emitted form the second light emission surface.

20. The diffusive body according to claim 1, wherein
the emitted scattered light simulates a sky, and
the scattering layer and the transmission layer both directly receive light from a light source, the light including the first light directly provided to the transmission layer and a second light directly provided to the scattering layer.

* * * * *